US012794072B2

(12) United States Patent
Hidaka et al.

(10) Patent No.: US 12,794,072 B2
(45) Date of Patent: Nov. 10, 2026

(54) ENERGY STORAGE APPARATUS

(71) Applicant: GS Yuasa International Ltd., Kyoto (JP)

(72) Inventors: Tsuyoshi Hidaka, Rittoshi (JP); Tomohiro Kawauchi, Rittoshi (JP); Toshiki Kusunoki, Rittoshi (JP); Yasutaka Miyawaki, Kyoto (JP); Atsushi Tokii, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 467 days.

(21) Appl. No.: 17/770,397

(22) PCT Filed: Oct. 22, 2020

(86) PCT No.: PCT/JP2020/039724
§ 371 (c)(1),
(2) Date: Apr. 20, 2022

(87) PCT Pub. No.: WO2021/079936
PCT Pub. Date: Apr. 29, 2021

(65) Prior Publication Data

US 2022/0384903 A1 Dec. 1, 2022

(30) Foreign Application Priority Data

Oct. 23, 2019 (JP) ................................ 2019-192414
Oct. 23, 2019 (JP) ................................ 2019-192415
Oct. 23, 2019 (JP) ................................ 2019-192418

(51) Int. Cl.
*H01M 50/317* (2021.01)
*H01M 10/04* (2006.01)
(Continued)

(52) U.S. Cl.
CPC ..... *H01M 50/317* (2021.01); *H01M 10/0481* (2013.01); *H01M 50/251* (2021.01);
(Continued)

(58) Field of Classification Search
CPC ............ H01M 50/317; H01M 50/251; H01M 50/394; H01M 50/271; H01M 10/0481; H01M 2220/10
See application file for complete search history.

(56) References Cited

U.S. PATENT DOCUMENTS 4,233,373 A * 11/1980 Meyler-Warlow .......................... H01M 50/176 174/153 G
9,537,130 B2 1/2017 Yoon
(Continued)

FOREIGN PATENT DOCUMENTS

JP 2009-170258 A 7/2009
JP 2010-056035 A 3/2010
(Continued)

OTHER PUBLICATIONS

International Search Report (ISR) (PCT Form PCT/ISA/210), in PCT/JP2020/039724, dated Dec. 28, 2020.

*Primary Examiner* — Brian R Ohara
*Assistant Examiner* — Emily Elizabeth Freeman
(74) *Attorney, Agent, or Firm* — McGinn IP Law Group, PLLC

(57) ABSTRACT

An energy storage apparatus includes: a plurality of energy storage devices each including a gas release valve, the plurality of energy storage devices being arranged along a predetermined direction in a posture where the gas release valves are directed in the same direction; an exhaust portion disposed on the gas release valves of the plurality of respective energy storage devices, the exhaust portion forming an exhaust path for a gas discharged from the gas release
(Continued)

valves; and a housing accommodating the plurality of the energy storage devices and the exhaust portion, wherein the exhaust portion includes an exhaust port portion that protrudes from the housing and forms an outlet portion of the exhaust path.

19 Claims, 17 Drawing Sheets

(51) Int. Cl.
*H01M 50/251* (2021.01)
*H01M 50/271* (2021.01)
*H01M 50/30* (2021.01)

(52) U.S. Cl.
CPC ....... *H01M 50/271* (2021.01); *H01M 50/394* (2021.01); *H01M 2220/10* (2013.01)

(56) References Cited

U.S. PATENT DOCUMENTS

| | | | | |
|---|---|---|---|---|
| 2010/0052692 | A1 | 3/2010 | Yano et al. | |
| 2011/0117401 | A1 | 5/2011 | Lee et al. | |
| 2012/0263982 | A1 | 10/2012 | Yasui et al. | |
| 2012/0319695 | A1 | 12/2012 | Yano et al. | |
| 2013/0224524 | A1* | 8/2013 | Nam | H01M 50/211 429/7 |
| 2013/0280577 | A1* | 10/2013 | Shin | H01M 50/124 429/120 |
| 2014/0356700 | A1* | 12/2014 | Song | H01M 50/553 429/181 |
| 2015/0230827 | A1 | 8/2015 | Zylber et al. | |
| 2016/0056433 | A1* | 2/2016 | Yokoyama | H01M 50/308 429/54 |
| 2016/0254515 | A1 | 9/2016 | Shimoda et al. | |
| 2018/0151859 | A1 | 5/2018 | Aizawa | |
| 2019/0140235 | A1 | 5/2019 | Lindstrom et al. | |
| 2022/0037713 | A1* | 2/2022 | Koga | H01M 10/613 |

FOREIGN PATENT DOCUMENTS

| | | | |
|---|---|---|---|
| JP | 2011-108653 | A | 6/2011 |
| JP | 2011-175844 | A | 9/2011 |
| JP | 2012-212558 | A | 11/2012 |
| JP | 2012-221646 | A | 11/2012 |
| JP | 2013-120690 | A | 6/2013 |
| JP | 2013-196981 | A | 9/2013 |
| JP | 2015-023027 | A | 2/2015 |
| JP | 2015-230827 | A | 12/2015 |
| JP | 2018-006274 | A | 1/2018 |
| JP | 2019-057469 | A | 4/2019 |
| JP | 2019-514191 | A | 5/2019 |
| WO | WO2012/073438 | A1 | 5/2014 |
| WO | WO2014/024434 | A1 | 7/2016 |
| WO | WO2017/006763 | A1 | 3/2018 |

* cited by examiner

ENERGY STORAGE APPARATUS

TECHNICAL FIELD

The present invention relates to an energy storage apparatus.

BACKGROUND ART

Conventionally, there has been known an energy storage apparatus where an exhaust portion (upper plate) is mounted on a plurality of energy storage devices (secondary batteries) that are arranged in a predetermined direction (see Patent Document 1). The exhaust portion is a member that forms a flow path of a gas released from gas release valves (vents) of respective energy storage devices, and the gas and an electrolyte solution are discharged from a distal end of the exhaust portion.

PRIOR ART DOCUMENT

Patent Document

Patent Document 1: JP-A-2011-108653

SUMMARY OF THE INVENTION

Problems to be Solved by the Invention

When an electrolyte solution having a high temperature drips from an exhaust portion, there is a possibility that the electrolyte solution is brought into contact with the energy storage apparatus itself so that the energy storage apparatus burns.

It is an object of the present invention to provide an energy storage apparatus that can increase safety during gas discharging.

Means for Solving the Problems

An energy storage apparatus according to an aspect of the present invention includes: a plurality of energy storage devices each having a gas release valve, the plurality of energy storage devices being arranged along a predetermined direction in a posture where the gas release valves are directed in the same direction; an exhaust portion disposed on the gas release valves of the plurality of respective energy storage devices, the exhaust portion forming an exhaust path for a gas discharged from the gas release valves; and a housing accommodating the plurality of the energy storage devices and the exhaust portion, wherein the exhaust portion has an exhaust port portion that protrudes from the housing and forms an outlet portion of the exhaust path.

Advantages of the Invention

According to the energy storage apparatus of the present invention, safety during gas discharging can be enhanced.

MODE FOR CARRYING OUT THE INVENTION

Figure 1:
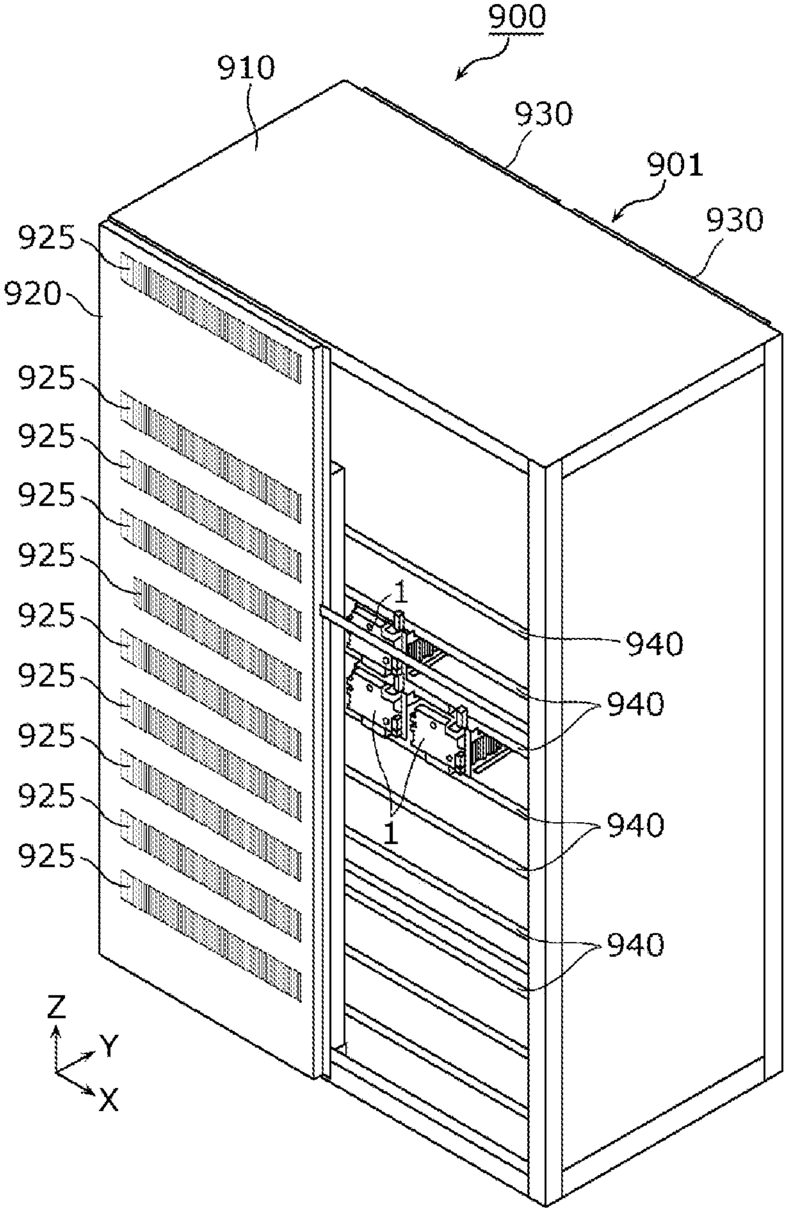
FIG. 1 is a perspective view illustrating an external appearance of an energy storage facility according to a first embodiment.

An energy storage apparatus according to an aspect of the present invention includes: a plurality of energy storage devices each including a gas release valve, the plurality of energy storage devices being arranged along a predetermined direction in a posture where the gas release valves are directed in the same direction; an exhaust portion disposed on the gas release valves of the plurality of respective energy storage devices, the exhaust portion forming an exhaust path for a gas discharged from the gas release valves; and a housing accommodating the plurality of the energy storage devices and the exhaust portion, wherein the exhaust portion includes an exhaust port portion that protrudes from the housing and forms an outlet portion of the exhaust path.

With such a configuration, the exhaust port portion protrudes from the housing and hence, an electrolyte solution dripped from the exhaust port portion drips down at a position away from the housing of the energy storage apparatus. This makes it difficult for the electrolyte solution having a high temperature come into contact with the housing of the energy storage apparatus. Accordingly, safety can be enhanced.

The exhaust port portion may have a shape in which one end is opened as viewed in the gas advancing direction. The exhaust port portion may protrude outward from a support member that supports the energy storage devices from below.

In a case where another apparatus is disposed adjacently to the energy storage apparatus, there is a possibility that a gas is intensively jetted from an exhaust portion of a predetermined energy storage apparatus to another apparatus disposed adjacently to the energy storage apparatus. As a result, there is a possibility that another apparatus disposed adjacently to the energy storage apparatus is heated to a high temperature so that such another apparatus burns. In the present aspect, the exhaust port portion has a shape in which one end is opened as viewed in the gas advancing direction. That is, the exhaust port portion has the shape where a part is opened and hence, a gas is discharged also from the opening portion. Therefore, a gas can be discharged to the outside in a diffused manner and hence, it is possible to suppress the gas from being intensively jetted to another apparatus disposed adjacently to the energy storage apparatus. Therefore, it is possible to suppress an adverse effect on another apparatus at the time of gas discharging, and it is possible to suppress burning of such another apparatus. With such a configuration, the energy storage apparatus of the present invention can enhance safety at the time of gas discharging.

A gas is discharged in a diffused manner and hence, a deposit caused by the gas is minimally accumulated in the exhaust port portion. As a result, clogging of an exhaust path can be suppressed and hence, smooth gas discharging can be maintained. Therefore, it is possible to provide the energy storage apparatus 1 having high safety.

The opening portion of the exhaust port portion may face upward.

With such a configuration, the exhaust port portion protrudes outward from the support member, and the opening portion of the exhaust port portion faces upward. Accordingly, it is possible to guide a gas and an electrolyte solution to a position away from the support member by the exhaust port portion. That is, the electrolyte solution having a high temperature is minimally discharged in the vicinity of the energy storage apparatus, and minimally falls on the support member. As a result, the burning of the energy storage apparatus caused by an electrolyte solution can be suppressed and hence, safety can be enhanced.

The opening portion of the exhaust port portion may face downward.

With such a configuration, the opening portion of the exhaust port portion faces downward and hence, it is possible to make a discharged electrolyte solution easily fall downward below the exhaust port portion. Therefore, a deposit that is discharged from the energy storage device is minimally accumulated in the exhaust port portion and hence, the clogging of the exhaust path can be suppressed with more certainty. Accordingly, safety can be further enhanced.

The housing may include a first reinforcing member that covers the plurality of energy storage devices from above. The exhaust port portion, and a protruding portion that protrudes from one end face of the energy storage apparatus in a predetermined direction may be formed on one end face of the energy storage apparatus in a predetermined direction. The protruding portion may be formed of one end of the first reinforcing member, and may be disposed between the exhaust port portion and a mounting surface of the energy storage apparatus.

With such a configuration, an eaves portion is disposed between the exhaust port portion and the mounting surface and hence, an electrolyte solution discharged from the exhaust port portion can be received by the protruding portion. The electrolyte solution is guided in a predetermined direction by the protruding portion and hence, the electrolyte solution is away from one end face of the energy storage apparatus. Therefore, it is possible to make it difficult for an electrolyte solution having a high temperature to come into contact with one end face of the energy storage apparatus.

The protruding portion is formed of one end of the first reinforcing member that covers the upper side of the plurality of energy storage devices. Accordingly, even when an electrolyte solution flows toward the energy storage devices on the protruding portion, the first reinforcing member itself forms a wall so that the further advancing of the electrolyte solution can be suppressed. Even when an electrolyte solution comes into contact with one end face (first reinforcing member) of the energy storage apparatus, the electrolyte solution does not advance to a member disposed inside the first reinforcing member (such as the energy storage device or the housing). As a result, the ignition in the energy storage apparatus caused by an electrolyte solution can be suppressed and hence, safety can be enhanced.

The exhaust port portion may protrude outward from the eaves portion along a predetermined direction from one end face.

With such a configuration, the exhaust port portion protrudes outward from the eaves portion. Accordingly, a gas and an electrolyte solution that have passed through the exhaust path are discharged at a position away from the eaves portion. That is, the electrolyte solution having a high temperature is not discharged in the vicinity of the energy storage apparatus, and minimally falls on the eaves portion. As a result, the burning of the energy storage apparatus caused by an electrolyte solution can be suppressed and hence, safety can be enhanced with more certainty.

When viewed from a predetermined direction, the exhaust port portion may be disposed above the center of one end face of the energy storage apparatus, and the protruding portion may be disposed below the center of one end face of the energy storage apparatus.

With such a configuration, the exhaust port portion is disposed on an upper portion of one end face, and the protruding portion is disposed on a lower portion of one end face. Accordingly, a fall path through which the electrolyte solution falls from the exhaust port portion and reaches the protruding portion can be elongated. Therefore, the time during which an electrolyte solution comes into contact with air can be prolonged and hence, the electrolyte solution can be cooled as much as possible. As a result, a temperature when an electrolyte solution comes into contact with the protruding portion can be lowered and hence, the thermal deformation and the burning of the protruding portion can be suppressed. As a result, safety can be further enhanced.

The energy storage apparatus may further include a second reinforcing member that is disposed below the plurality of energy storage devices and reinforces the plurality of energy storage devices by sandwiching the plurality of energy storage devices together with the first reinforcing member. The protruding portion may connect one end of the first reinforcing member and one end of the second reinforcing member to each other. The exhaust portion may be pressed by the first reinforcing member.

With such a configuration, the exhaust portion is pressed by the first reinforcing member. Accordingly, even when the exhaust portion intends to lift due to discharging of a gas from the gas release valve, lifting of the exhaust portion can be suppressed by the first reinforcing member. As described above, the first reinforcing member has both the function as the protruding portion and the function of suppressing lifting of the exhaust portion. Accordingly, compared with the case where dedicated members are provided for realizing these functions respectively, the number of components can be reduced. If the number of components can be reduced, the number of components that have possibility of burning can be reduced and hence, safety can be improved.

The exhaust portion may press the plurality of energy storage devices by a pressing force that the exhaust portion receives from the first reinforcing member.

With such a configuration, the exhaust portion presses the plurality of energy storage devices by the pressing force that the exhaust portion receives from the first reinforcing member. Accordingly, it is possible to suppress the positional displacement of the plurality of energy storage devices in the vertical direction. As described above, the first reinforcing member has the function of suppressing the positional displacement of the energy storage devices in addition to the function as the eaves portion and the function of suppressing lifting of the exhaust portion. Accordingly, compared with the case where dedicated members are provided for realizing these functions respectively, the number of components can be reduced. If the number of components can be reduced, the number of components that have possibility of burning can be reduced and hence, safety can be improved.

The protruding portion may be inserted into a support hole formed in a support member that supports the mounting surface of the energy storage apparatus from below.

With such a configuration, the protruding portion is inserted into the support hole formed in the support member. Accordingly, in the case where the energy storage apparatus is accommodated by sliding the energy storage apparatus in a predetermined direction with respect to the support member, the protruding portion can be easily inserted into the support hole. At the time of inserting the protruding portion, a positioning operation is difficult because of the presence of a restriction on space on one end side that forms a depth side. However, in the case where the eaves portion can be inserted into the support hole only by the above-described sliding operation, the positioning operation can be facilitated.

After the insertion, the protruding portion is inserted into the support hole. Accordingly, the movement of the energy storage apparatus can be restricted by the engagement relationship between the protruding portion and the support hole. In this manner, the movement of the energy storage apparatus can be restricted by the protruding portion without providing a member dedicated for the restriction of the movement of the energy storage apparatus. Accordingly, the number of components can be reduced. If the number of components can be reduced, the number of components that have possibility of burning can be reduced and hence, safety can be improved.

The exhaust port portion may have a first fin protruding from the housing in an inclined state.

A case is estimated where another apparatus is disposed in the vicinity of the exhaust port portion of the energy storage apparatus. When a gas is jetted from the exhaust port portion of the energy storage apparatus in such a state, another apparatus is exposed to a gas having a high temperature. Accordingly, there is a possibility that another apparatus burns. According to the present aspect, the first fin protrudes from the housing in an inclined state and hence, the course of a gas can be controlled by the first fin. Therefore, it is possible to prevent a gas from impinging on another apparatus disposed adjacently to the energy storage apparatus. The first fin serves as a barrier when a gas advances straight. Accordingly, it is also possible to reduce flow energy of a gas that advances toward another apparatus. Therefore, it is possible to suppress an adverse effect of a gas on another apparatus at the time of gas discharging, and it is possible to suppress burning of such another apparatus. With such a configuration, the energy storage apparatus of the present invention can enhance safety at the time of gas discharging.

The exhaust port portion may have a plurality of other fins that surround an outlet portion together with the first fin.

According to this, the outlet portion of the exhaust path is surrounded by the first fin and the plurality of other fins. Accordingly, the course of a gas can be controlled with more certainty. As a result, it is possible to prevent a gas from impinging on another apparatus with more certainty and hence, it is possible to further enhance safety at the time of gas discharging.

A gap may be formed in at least one of spaces formed between the first fin and the plurality of other fins.

With such a configuration, a gap is formed in at least one of the spaces formed between the first fin and the plurality of other fins. Accordingly, a gas is discharged also through the gap. As a result, a gas is diffused and hence, it is possible to prevent a gas from impinging on another apparatus with more certainty. Accordingly, it is possible to further enhance safety at the time of gas discharging.

The energy storage apparatus may include a cover member that has an opening portion through which the exhaust port portion is made to protrude. The plurality of other fins may include a second fin that faces the first fin, and a third fin and a fourth fin that are disposed between the first fin and the second fin in a circumferential direction. The first fin, the third fin, and the fourth fin may be mounted on the exhaust portion, and the second fin may be mounted on the cover member.

In such a configuration, the first fin, the third fin, and the fourth fin are mounted on the exhaust portion, and the second fin is mounted on the cover member. Accordingly, a structure where the outlet portion is surrounded by the respective fins can be easily formed.

The housing is covered with the cover member and hence, it is possible to suppress applying of an electrolyte solution discharged together with a gas from the exhaust port portion to the housing. Accordingly, it is possible to suppress the ignition caused by the electrolyte solution. Accordingly, it is possible to further enhance safety at the time of gas discharging.

The first fin may be disposed above the exhaust path, and may be inclined such that a distal end of the first fin faces downward.

With such a configuration, the first fin is disposed above the exhaust path and the distal end of the first fin is inclined so as to face downward. Accordingly, it is possible to make a gas impinge on the first fin with certainty and hence, the course of the gas can be controlled with certainty. Accordingly, it is possible to further enhance safety at the time of gas discharging.

The first fin is positioned within the exhaust path when the exhaust path is viewed in a gas advancing direction. Accordingly, it is possible to suppress large-sizing of the energy storage apparatus in an upward direction.

The first fin is inclined such that the distal end of the first fin faces downward. Accordingly, a gas can be easily discharged to an area in the vicinity of the energy storage apparatus, and can easily stay in the rack that accommodates the energy storage apparatus. Therefore, such a configuration is suitable when the diffusion of a gas to the outside of the rack is not desirable.

The first fin may be disposed above the exhaust path, and may be inclined such that the distal end of the first fin faces upward.

A gas discharged from the exhaust port portion has a high temperature and hence, the gas is likely to rise. The first fin is inclined such that the distal end of the first fin faces upward. Accordingly, the rising of the gas is minimally blocked. Therefore, the gas G can be discharged to a place remote from the energy storage apparatus and hence, the configuration is suitable for a case where it is desirable to allow the gas G to be discharged while preventing the gas G from staying in the rack.

Hereinafter, energy storage facilities according to embodiments (including modifications of the embodiments) of the present invention are described with reference to the drawings. The present embodiments described hereinafter describe both a comprehensive example and specific examples. In the following embodiment, numerical values, shapes, materials, constitutional elements, arrangement positions and connection modes of the constituent elements, and the like are provided as examples, and are not intended to limit the present invention. In the respective drawings, sizes and the like are not strictly illustrated.

In the description made hereinafter and in the drawings, an arrangement direction of a plurality of energy storage apparatuses arranged on one shelf plate, an arrangement direction of a pair of electrode terminals (a positive electrode side and a negative electrode side) in one energy storage device, a direction that a pair of short side surfaces of a case of one energy storage device face each other, an arrangement direction that a pair of long side surfaces of an outer case of the energy storage unit are defined as an X-axis direction. A direction that a front cover and a rear cover face each other, an insertion direction that the energy storage apparatus is inserted with respect to a shelf plate, an arrangement direction of the plurality of energy storage devices, a direction that a pair of long side surfaces of the cases of the energy storage devices face each other, and a direction that a pair of short side surfaces of the outer case of the energy storage unit face each other are defined as a Y-axis direction. An arrangement direction of the plurality of shelf plates, an arrangement direction of an outer case support and an outer case lid of the energy storage unit, an arrangement direction of the energy storage devices and bus bars, an arrangement direction of the case body and the lid of the energy storage device, or a vertical direction is defined as a Z-axis direction. These X-axis direction, Y-axis direction, and Z-axis direction are directions that intersect with each other (orthogonal to each other in the embodiment). A case is considered where the Z-axis direction is not the vertical direction depending on a use mode. However, in the description made hereinafter, for the sake of convenience of the description, the description is made by assuming the Z-axis direction as the vertical direction.

In the description made hereinafter, an X-axis plus direction indicates an arrow direction of the X-axis, and an X-axis minus direction indicates a direction opposite to the X-axis plus direction. The same goes for the Y-axis direction and the Z-axis direction. In the following description, there may also be a case where the Y-axis direction is referred to as a first direction, the X-axis direction is referred to as a second direction, and the Z-axis direction is referred to as a third direction. Expressions indicating the relative directions or the relative postures such as "parallel" or "orthogonal" also include cases where such directions or postures are not considered as such directions or such postures in a strict meaning of the terms. A state where two directions are orthogonal to each other means not only a state where these two directions are completely orthogonal to each other but also a state where these two directions are substantially orthogonal to each other, that is, a state where these two directions are orthogonal to each other with slight difference of about a few percent.

First Embodiment

[1 Description of Configuration of Energy Storage Facility]

First, a configuration of an energy storage facility 900 according to the present embodiment will be described. The energy storage facility 900 is a stationary storage battery board that stores electric power generated by power generation such as wind power generation or solar power generation, and stably supplies the electric power to an external installation.

Figure 2:
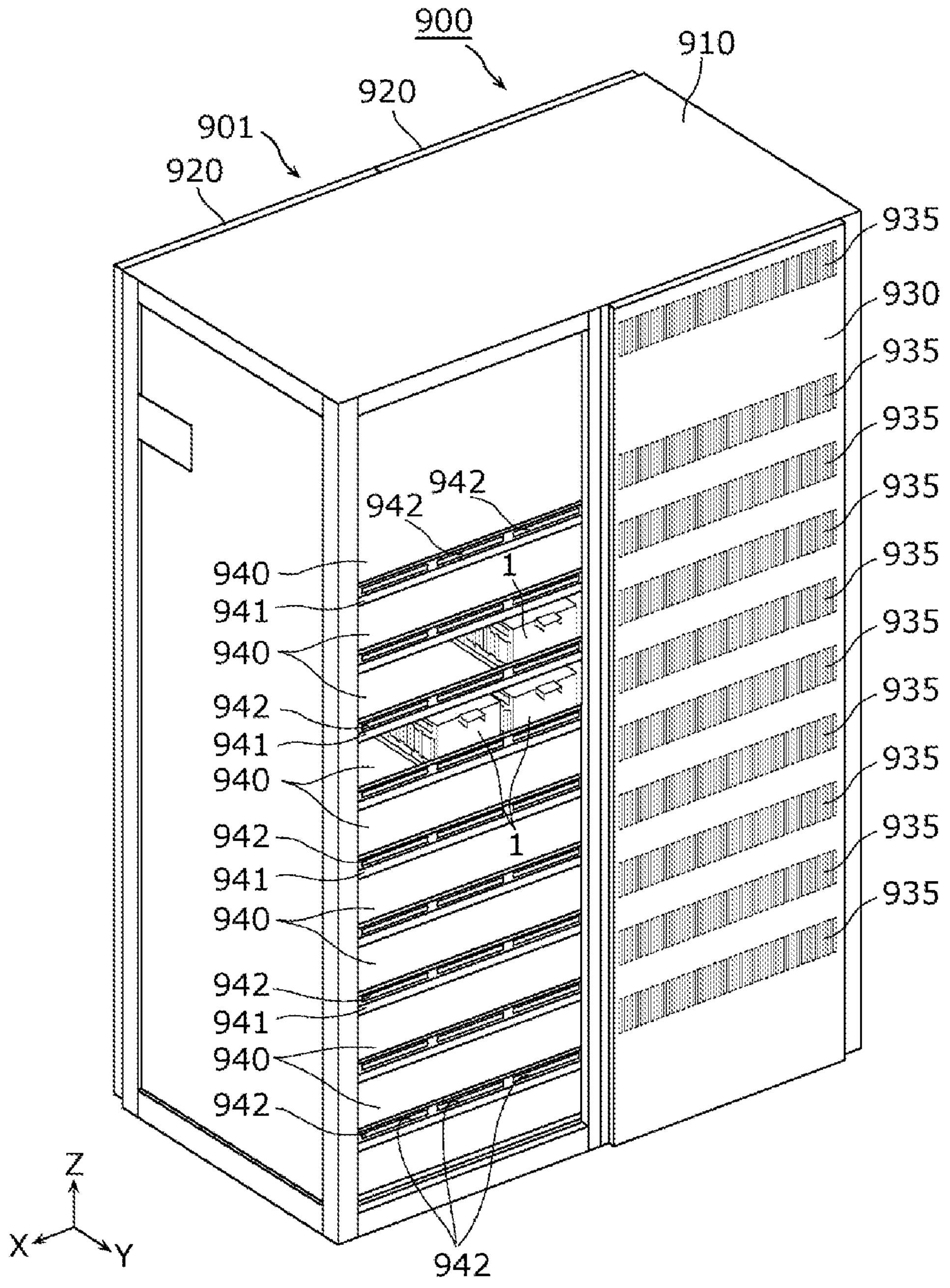
FIG. 2 is a perspective view illustrating an external appearance of the energy storage facility according to the first embodiment.

FIG. 1 and FIG. 2 are perspective views illustrating an external appearance of the energy storage facility 900 according to the first embodiment. FIG. 1 is a perspective view of the energy storage facility 900 as viewed from a front side, and FIG. 2 is a perspective view of the energy storage facility 900 as viewed from a back side.

As illustrated in FIG. 1, the energy storage facility 900 includes a metal rack 901 and a plurality of energy storage apparatuses 1. The rack 901 includes a rack body 910, a pair of front covers 920, a pair of rear covers 930, and a plurality of shelf plates 940. In FIG. 1, one front cover 920 of the pair of front covers 920 is not illustrated. In FIG. 2, out of the pair of rear covers 930, one rear cover 930 is not illustrated. FIG. 1 and FIG. 2 illustrate a case where three energy storage apparatuses 1 in total are installed on the plurality of shelf plates 940. However, the number of installed energy storage apparatuses 1 is not limited to three.

The rack body 910 is a rectangular box body made of metal, and an opening is formed on a front surface and a back surface of the rack body 910 respectively. The opening formed on the front surface of the rack body 910 is covered with the pair of front covers 920. The pair of front covers 920 is disposed side by side in the X-axis direction. The front covers 920 are mounted on a front portion of the rack body 910 so as to open and close an opening formed in the front surface of the rack body 910. The opening formed on the back surface of the rack body 910 is covered with the pair of rear covers 930. The pair of rear covers 930 is disposed side by side in the X-axis direction. The rear covers 930 are mounted on a back portion of the rack body 910 so as to open and close the opening formed in the back surface of the rack body 910.

Although not illustrated, an electric circuit unit that is connected to the plurality of energy storage apparatuses 1 is disposed in the rack body 910. The electric circuit unit accommodates a wiring breaker (circuit breaker), a control circuit, and the like. The circuit breaker is disposed on a main circuit through which a main current for charging and discharging the respective energy storage apparatuses 1 flows, and the control circuit is connected to the substrate unit 20 (see FIG. 4) of each energy storage apparatus 1 by a signal line (not illustrated).

A plurality of slit groups 925 and 935 for ventilation are formed on each front cover 920 and each rear cover 930. Specifically, the plurality of slit groups 925 are arranged in the front cover 920 in the Z-axis direction. In one slit group 925, a plurality of slits that are elongated in the Z-axis direction are arranged along the X-axis direction. The plurality of slit groups 935 are arranged in the rear cover 930 in the Z-axis direction. In one slit group 935, a plurality of slits that are elongated in the Z-axis direction are arranged along the X-axis direction. The inside of the rack body 910 is ventilated by the plurality of slit groups 925 and 935 so that heat is not accumulated in the rack body 910.

[2 Shelf Plates]

In the inside of the rack body 910, a plurality of shelf plates 940 are arranged in the Z-axis direction at a predetermined interval. The shelf plate 940 is an example of a support member that supports the plurality of energy storage apparatuses 1. Specifically, the shelf plate 940 is a plate body disposed parallelly to an XY plane. The plurality of energy storage apparatuses 1 can be mounted on one shelf plate 940 such that the energy storage apparatuses 1 are arranged in the X-axis direction. The slit group 925 faces an end of the energy storage apparatus 1 mounted on the shelf plate 940 in the Y-axis minus direction. In the same manner, the slit group 935 faces an end of the energy storage apparatus 1 mounted on the shelf plate 940 in the Y-axis plus direction. With such a configuration, the heat released from the energy storage apparatuses 1 can be smoothly discharged from the slit groups 925 and 935 to the outside of the rack 901.

A stopper 941 that protrudes upward is integrally formed on an end of the shelf plate 940 in the Y-axis plus direction.

Figure 3:
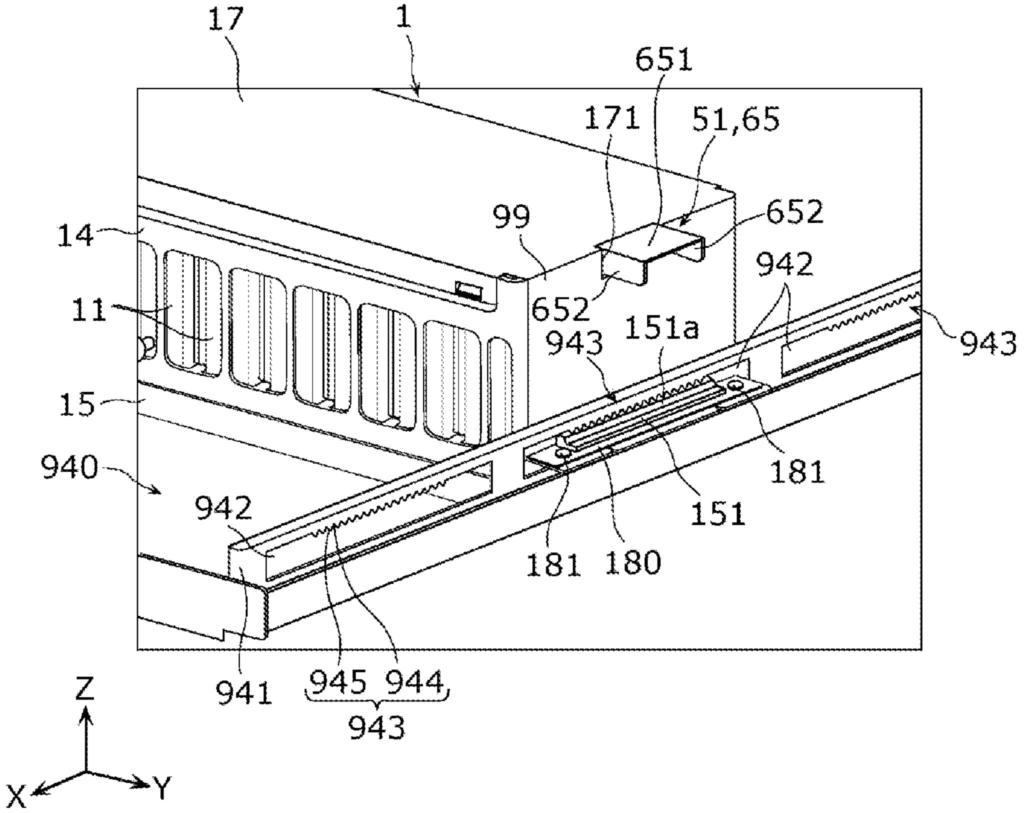
FIG. 3 is a perspective view illustrating the schematic configuration of a stopper according to the first embodiment.

FIG. 3 is a perspective view illustrating the schematic configuration of the stopper 941 according to the first embodiment. As illustrated in FIG. 3, the stopper 941 is brought into contact with an end of the energy storage apparatus 1 in the Y-axis plus direction so that the movement of the energy storage apparatus 1 in the Y-axis plus direction is restricted. Specifically, the stopper 941 is a plate body that is parallel to an XZ plane and is elongated in the X-axis direction. A plurality of support holes 942 are formed in the stopper 941 at a predetermined interval along the X-axis direction. The support hole 942 penetrates the stopper 941 in the Y-axis direction. The support hole 942 is a rectangular hole elongated in the X-axis direction. One support hole 942 corresponds to one energy storage apparatus 1. A protruding portion 180 formed on an end of the energy storage apparatus 1 in the Y-axis plus direction is inserted into the support hole 942 from the Y-axis minus direction. In the stopper 941, a serrated structure 943 that is brought into contact with the protruding portion 180 is formed on a peripheral edge of the support hole 942.

Specifically, the serrated structure 943 is formed on an upper portion of the support hole 942 and on an edge of a central portion of the support hole 942. The serrated structure 943 is formed by alternately and repeatedly arranging a plurality of sets of concave parts 944 and a plurality of sets of convex parts 945. The serrated structure 943 should have at least one concave part 944 or at least one convex part 945. Distal ends of the convex parts 945 are formed in an acute angle shape such that the convex parts 945 bite into the protruding portion 180. The distal ends of the convex parts 945 are brought into contact with the protruding portion 180 and hence, the movement of the energy storage apparatus 1 in the X-axis direction and the Y-axis direction can be restricted. Details of the protruding portion 180 will be described later.

[3 Energy Storage Apparatus]

Figure 4:
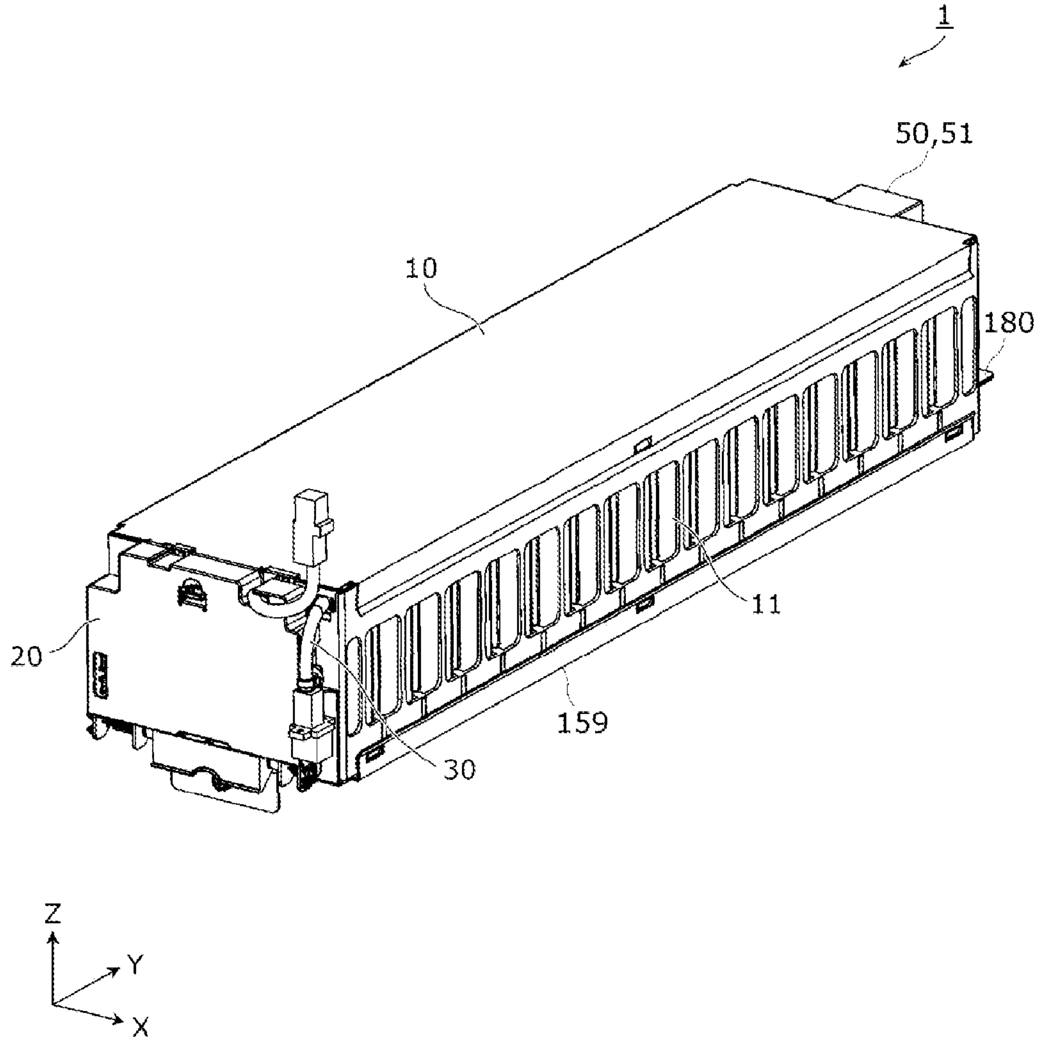
FIG. 4 is a perspective view illustrating an external appearance of the energy storage apparatus according to the first embodiment.
Figure 5:
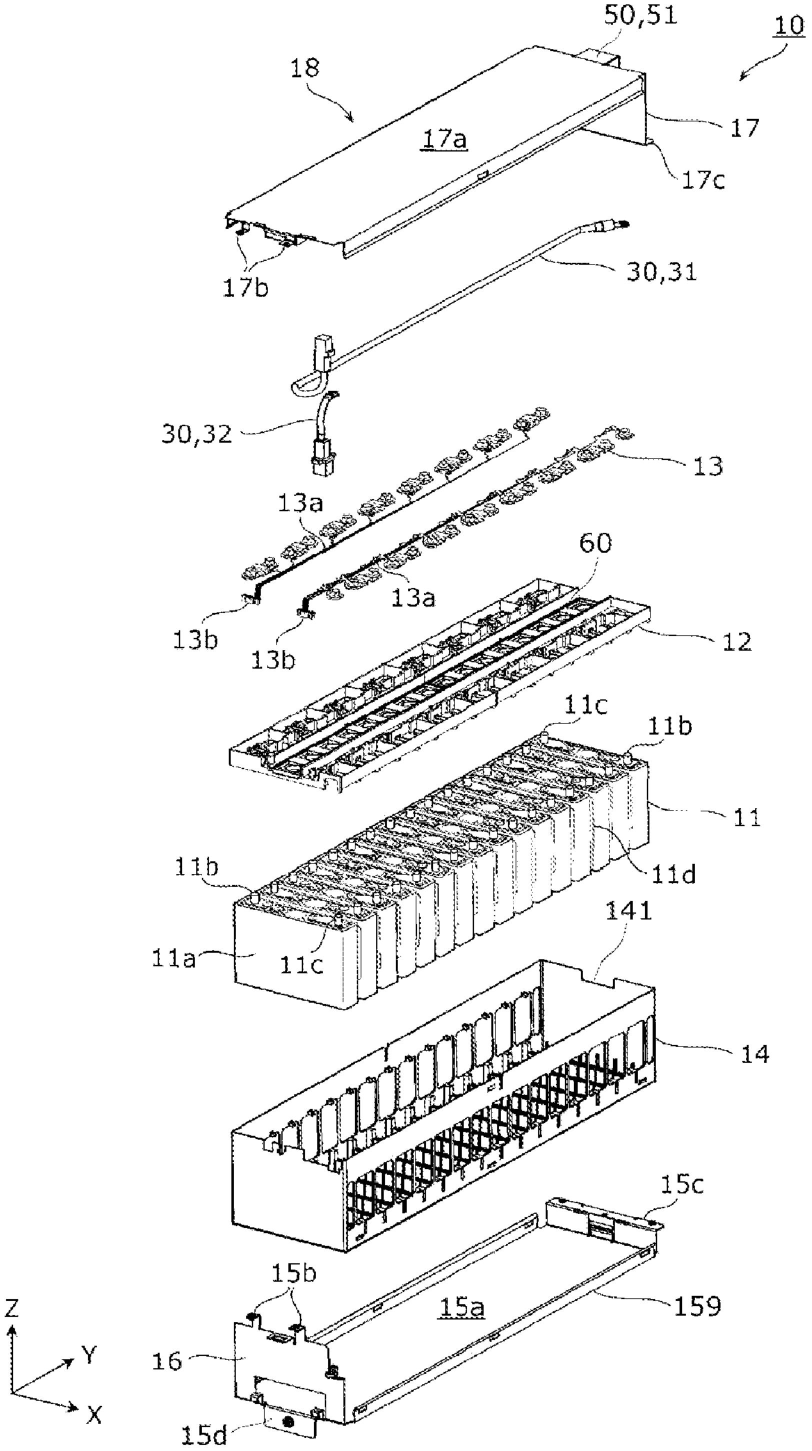
FIG. 5 is an exploded perspective view of the energy storage unit according to the first embodiment illustrating respective constitutional elements in a state where the energy storage unit is disassembled.

Next, a configuration of the energy storage apparatus 1 according to the present embodiment will be described. FIG. 4 is a perspective view illustrating an external appearance of the energy storage apparatus 1 according to the first embodiment. FIG. 5 is an exploded perspective view of an energy storage unit 10 according to the first embodiment illustrating respective constituent elements in a state where the energy storage unit 10 is disassembled.

The energy storage apparatus 1 is an apparatus in which electricity is charged from the outside and from which electricity is discharged to the outside. In the present embodiment, the energy storage apparatus 1 has an approximately rectangular parallelepiped shape. The energy storage apparatus 1 is used in an electricity storage application, a power source application, or the like. Specifically, the energy storage apparatus 1 can be used as a stationary battery or the like that is used as a home-use or industry-use energy storage facility or the like. The energy storage apparatus 1 can be used as a battery or the like for driving a mobile body such as an automobile, a motorcycle, a watercraft, a ship, a snowmobile, an agriculture machine, a construction machine, or a railway vehicle for an electric railway, or is used as a battery for starting an engine of the mobile body. As the above-described automobile, an electric vehicle (EV), a hybrid electric vehicle (HEV), a plug-in hybrid electric vehicle (PHEV), and a gasoline automobile are exemplified. As the above-described railway vehicle for an electric railway, an electric train, a monorail, and a linear motor car are exemplified.

As illustrated in FIG. 4 and FIG. 5, the energy storage apparatus 1 includes the energy storage unit 10, and the substrate unit 20 mounted on the energy storage unit 10. The energy storage unit 10 is a battery module (assembled battery) having a substantially rectangular parallelepiped shape elongated in the Y-axis direction. Specifically, the energy storage unit 10 includes: a plurality of energy storage devices 11; a bus bar frame 12; an exhaust portion 50; a plurality of bus bars 13; and an outer case 18 formed of an outer case body 14, an outer case support 15 and an outer case lid 17 that house these members. A cable 30 is connected to the energy storage unit 10. The energy storage unit 10 may include binding members (end plates, side plates and the like) that bind the plurality of energy storage devices 11.

The energy storage device 11 is a secondary battery (battery cell) that can charge electricity or discharge electricity. More specifically, the energy storage device 11 is a nonaqueous electrolyte secondary battery such as a lithium ion secondary battery. The energy storage device 11 has a flat rectangular parallelepiped shape (prismatic shape). In this embodiment, sixteen pieces of energy storage devices 11 are arranged side by side in the Y-axis direction. The shape, the arrangement position, the number, and the like of the energy storage devices 11 are not particularly limited. The energy storage device 11 is not limited to a nonaqueous electrolyte secondary battery. The energy storage device 11 may be a secondary battery other than the nonaqueous electrolyte secondary battery, or may be a capacitor. The energy storage device 11 is not necessarily a secondary battery, and may be a primary battery that allows a user to use stored electricity even when the user does not charge the battery. The energy storage device 11 may be a battery that uses a solid electrolyte. The energy storage device 11 may be a laminate type energy storage device.

Specifically, the energy storage device 11 includes a case 11*a* made of metal that forms a body portion. A positive electrode terminal 11*b* that is an electrode terminal made of metal, and a negative electrode terminal 11*c* that is an electrode terminal made of metal are mounted on a lid of the case 11*a*. That is, the positive electrode terminal 11*b* and the negative electrode terminal 11*c* are mounted on an upper surface of the body portion. On a lid of the case 11*a*, a gas release valve 111 (see FIG. 8) that releases a pressure by discharging a gas when the pressure in the case 11*a* increases is mounted between the positive electrode terminal 11*b* and the negative electrode terminal 11*c*. The plurality of energy storage devices 11 are arranged in a posture where the gas release valves 111 face the same direction (Z-axis plus direction). A spacer 11*d* having a flat plate shape and having a heat insulating property is disposed between the energy storage devices 11 disposed adjacently to each other. An electrolyte solution filling portion or the like for filling an electrolyte solution may be mounted on the lid of the case 11*a*. Inside the case 11*a*, an electrode assembly (also referred to as an energy storage element or a power generating element), current collectors (a positive electrode current collector and a negative electrode current collector) and the like are disposed. An electrolyte solution (nonaqueous electrolyte) or the like is sealed in the case 11*a*. However, the detailed description is omitted.

The positive electrode terminal 11*b* and the negative electrode terminal 11*c* protrude upward (Z-axis plus direction) from the lid of the case 11*a*. The outermost positive electrode terminal 11*b* and the outermost negative electrode terminal 11*c* that the plurality of energy storage devices 11 have are connected to the cable 30. With such a configuration, electricity from the outside is charged to the energy storage apparatus 1, and electricity charged in the energy storage apparatus 1 is discharged to the outside.

The cable 30 is an electric wire (also referred to as a power supply cable, a power cable, a power supply line, or a power line) through which a current (also referred to as a charge and discharge current or a main current) for charging or discharging the energy storage apparatus 1 (energy storage device 11) flows. The cable 30 includes: a positive electrode power supply cable 31 of a positive electrode; and a negative electrode power supply cable 32 of a negative electrode. That is, among the plurality of energy storage devices 11, the positive electrode power supply cable 31 of the cable 30 is connected to the positive electrode terminal 11*b* of the energy storage device 11 at the end in the Y-axis plus direction, and the negative electrode power supply cable 32 of the cable 30 is connected to the negative electrode terminal 11*c* of the energy storage device 11 at the end in the Y-axis minus direction.

The bus bar frame 12 is a flat rectangular member that is capable of electrically insulating the bus bars 13 and other members from each other. The bus bar frame 12 is also capable of restricting the positions of the bus bars 13. The bus bar frame 12 is formed of an insulating member such as polycarbonate (PC), polypropylene (PP), or polyethylene (PE). Specifically, the bus bar frame 12 is placed above the plurality of energy storage devices 11, and is positioned with respect to the plurality of energy storage devices 11. The plurality of bus bars 13 are placed and positioned on the bus bar frame 12. With such a configuration, the respective bus bars 13 are positioned with respect to the plurality of energy storage devices 11, and are joined to the positive electrode terminals 11*b* and the negative electrode terminals 11*c* that the plurality of energy storage devices 11 include respectively. Details of the bus bar frame 12 will be described later.

The exhaust portion 50 is disposed above the bus bar frame 12. The exhaust portion 50 forms an exhaust path 59 (see FIG. 8) for a gas that is discharged from the gas release valves 111 of the respective energy storage devices 11. One end of the exhaust portion 50 in the Y-axis plus direction forms an exhaust port portion 51 from which a gas is discharged. The exhaust port portion 51 protrudes from one end of the outer case 18 in the Y-axis plus direction. Details of the exhaust portion 50 will be described later.

The respective bus bars 13 are disposed above the plurality of energy storage devices 11 (on the bus bar frame 12). Each bus bar 13 is a rectangular plate-shaped member that electrically connects the electrode terminals of the plurality of energy storage devices 11 to each other. The bus bar 13 is made of metal such as aluminum, an aluminum alloy, copper, a copper alloy, a nickel material or the like. In the embodiment, each bus bar 13 connects the positive electrode terminal 11*b* and the negative electrode terminal 11*c* of the energy storage devices 100 disposed adjacently to each other. With such a configuration, sixteen pieces of the energy storage devices 11 are connected in series. The plurality of bus bars 13 are divided into: a first bus bar group arranged along the Y-axis direction on the X-axis plus direction side (one side); and a second bus bar group arranged along the Y-axis direction on the X-axis minus direction side (the other side). The mode of connection of the energy storage devices 11 is not limited to the above, and the series connection and the parallel connection may be combined in any forms.

A detection line 13*a* is connected to the bus bars 13 or the electrode terminals of the energy storage device 11. The detection line 13*a* is a cable for detecting a state of each energy storage device 11. The detection line 13*a* is an electric wire for measuring a voltage of the energy storage device 11, for measuring a temperature of the energy storage device, or for balancing a voltage between the energy storage devices 11. The detection line 13*a* is also referred to as a communication cable, a control cable, a communication line or a control line. A thermistor (not illustrated) for measuring a temperature of the energy storage device 11 is disposed on the bus bar 13 or the electrode terminal of the energy storage device 11. However, the description of the thermistor is omitted. A connector 13*b* is connected to an end of the detection line 13*a* in the Y-axis minus direction. The connector 13*b* is a connector connected to a substrate of the substrate unit 20 described later. That is, the detection line 13*a* transmits information such as a voltage and a temperature of the energy storage device 11 to the substrate of the substrate unit 20 through the connector 13*b*. The detection line 13*a* also has a function of balancing a voltage between the energy storage devices 11 by discharging electricity from the energy storage device 11 having a high voltage by a control performed by the substrate.

The outer case 18 is a housing (module case) having a rectangular shape (box shape) that forms an outer case of the energy storage unit 10. That is, the outer case 18 is disposed outside the energy storage devices 11 and the like, fixes the energy storage devices 11 and the like at predetermined positions, and protects the energy storage devices 11 and the like from an impact or the like. The outer case 18 includes: an outer case body 14 that forms the body of the outer case 18; the outer case support 15 that supports the outer case body 14; and the outer case lid 17 that forms a lid (outer lid) of the outer case 18.

The outer case body 14 is a bottomed rectangular cylindrical housing in which an opening is formed. The outer case body 14 is formed of an insulating member made of PC, PP, PE or the like. The outer case body 14 houses the plurality of energy storage devices 11, the exhaust portion 50, the bus bar frame 12 and the like. A cutout portion 141 through which the exhaust port portion 51 of the exhaust portion 50 penetrates is formed at an end of the outer case body 14 in the Y-axis plus direction and at the center of an upper portion of the end. The cutout portion 141 is a rectangular cutout having an open upper side.

The outer case support 15 and the outer case lid 17 are members that protect (reinforce) the outer case body 14. The outer case support 15 and the outer case lid 17 are formed of members made of metal such as stainless steel, aluminum, an aluminum alloy, iron, a plated steel plate, or the like. The outer case support 15 and the outer case lid 17 may be formed of members made of the same material, or may be formed of members made of different materials.

The outer case support 15 is an example of a second reinforcing member that supports the outer case body 14 from a lower side (Z-axis minus direction). The outer case support 15 includes a bottom portion 15*a*, a substrate unit mounting portion 16, connecting portions 15*b* and 15*c*, and a fixing portion 15*d*. The bottom portion 15*a* is a flat plate-shaped and rectangular portion that forms a bottom portion of the energy storage apparatus 1. The bottom portion 15*a* extends in parallel to the XY plane and in the Y-axis direction. The bottom portion 15*a* is disposed below the outer case body 14. When the energy storage apparatus 1 is disposed on the shelf plate 940, a lower surface of the bottom portion 15*a* is brought into contact with an upper surface of the shelf plate 940. That is, the lower surface of the bottom portion 15*a* forms a mounting surface 159 that is mounted on the shelf plate 940.

The substrate unit mounting portion 16 is a flat plate-shaped and rectangular portion raised in the Z-axis plus direction from an end of the bottom portion 15*a* in the Y-axis minus direction. The substrate unit 20 is mounted on the substrate unit mounting portion 16. The connecting portion 15*b* is a portion that is disposed at an end of the substrate unit mounting portion 16 in the Z-axis plus direction, and projects in the Y-axis minus direction. The connecting portion 15*b* is connected to the outer case lid 17. The connecting portion 15*c* is a portion that is raised in the Z-axis plus direction from an end of the bottom portion 15*a* in the Y-axis plus direction, and projects in the Y-axis plus direction. The connecting portion 15*c* is connected to the outer case lid 17. The fixing portion 15*d* is a flat plate-shaped and rectangular portion raised in the Z-axis minus direction from an end of bottom portion 15*a* in the Y-axis minus direction. The fixing portion 15*d* forms an end that is fixed to an end of the shelf plate 940 in the Y-axis minus direction. The fixing portion 15*d* is disposed at a center portion of the bottom portion 15*a* in the X-axis direction. In the embodiment, screwing is used for fixing the fixing portion 15*d* and the shelf plate 940 to each other. However, any fixing method may be used as long as such fixing and releasing of the fixing can be performed as desired.

The outer case lid 17 is an example of a first reinforcing member that covers an upper side of the plurality of energy storage devices 11. Specifically, the outer case lid 17 is a cover member that covers the outer case body 14 so as to close an opening of the outer case body 14. The outer case lid 17 has a top surface portion 17*a* and connecting portions 17*b* and 17*c*. The top surface portion 17*a* is a flat plate-shaped and rectangular portion that forms an upper surface portion of the energy storage apparatus 1. The top surface portion 17*a* extends in parallel to the XY plane and in the Y-axis direction. The top surface portion 17*a* is disposed above the outer case body 14. The connecting portions 17*b* are portions that are disposed at an end of the top surface portion 17*a* in the Y-axis minus direction, and project in the Y-axis minus direction. The connecting portions 17*b* are connected to the connecting portions 15*b* of the outer case support 15. The connecting portion 17*c* is a portion that extends in the Z-axis minus direction from an end of the top surface portion 17*a* in the Y-axis plus direction, and projects in the Y-axis plus direction. The connecting portion 17*c* is connected to the connecting portion 15*c* of the outer case support 15. As described above, the outer case support 15 and the outer case lid 17 are fixed to each other by connecting the connecting portions 15*b* and 15*c* and the connecting portions 17*b* and 17*c* by screwing or the like in a state where the outer case body 14 is sandwiched between the outer case support 15 and the outer case lid 17 in the vertical direction. With such a configuration, the respective members (bus bar frame 12, the plurality of energy storage devices 11, and exhaust portion 50) housed in the inside of the outer case body 14 are sandwiched by the outer case support 15 and the outer case lid 17 in the vertical direction. The connecting portion 15*c* and the connecting portion 17*c* that are connected to each other form a protruding portion 180. Details of the protruding portion 180 will be described later.

An opening portion 171 (see FIG. 7 and the like) through which the exhaust port portion 51 of the exhaust portion 50 passes is formed in the connecting portion 17*c* of the outer case lid 17 at the center of an upper end (an end in the Z-axis plus direction). The opening portion 171 has a shape that corresponds to an outer shape of the exhaust portion 50 as viewed in a plan view. In the present embodiment, the opening portion 171 has a rectangular shape as viewed in a plan view. The exhaust port portion 51 of the exhaust portion 50 protrudes from the outer case 18 by passing through the opening portion 171 and the cutout portion 141 formed in the outer case body 14.

As illustrated in FIG. 4, the substrate unit 20 is a device capable of monitoring a state of the energy storage devices 11 that the energy storage unit 10 includes and also capable of controlling the energy storage devices 11. In the present embodiment, the substrate unit 20 is a flat rectangular member mounted on an end of the energy storage unit 10 in the longitudinal direction. That is, the substrate unit 20 is mounted on a side surface of the energy storage unit 10 in the Y-axis minus direction. Specifically, the substrate unit 20 is rotatably mounted on the substrate unit mounting portion 16 (see FIG. 5) that is mounted on the outer case support 15 that the outer case 18 of the energy storage unit 10 includes.

[4 Bus Bar Frame]

Figure 6:
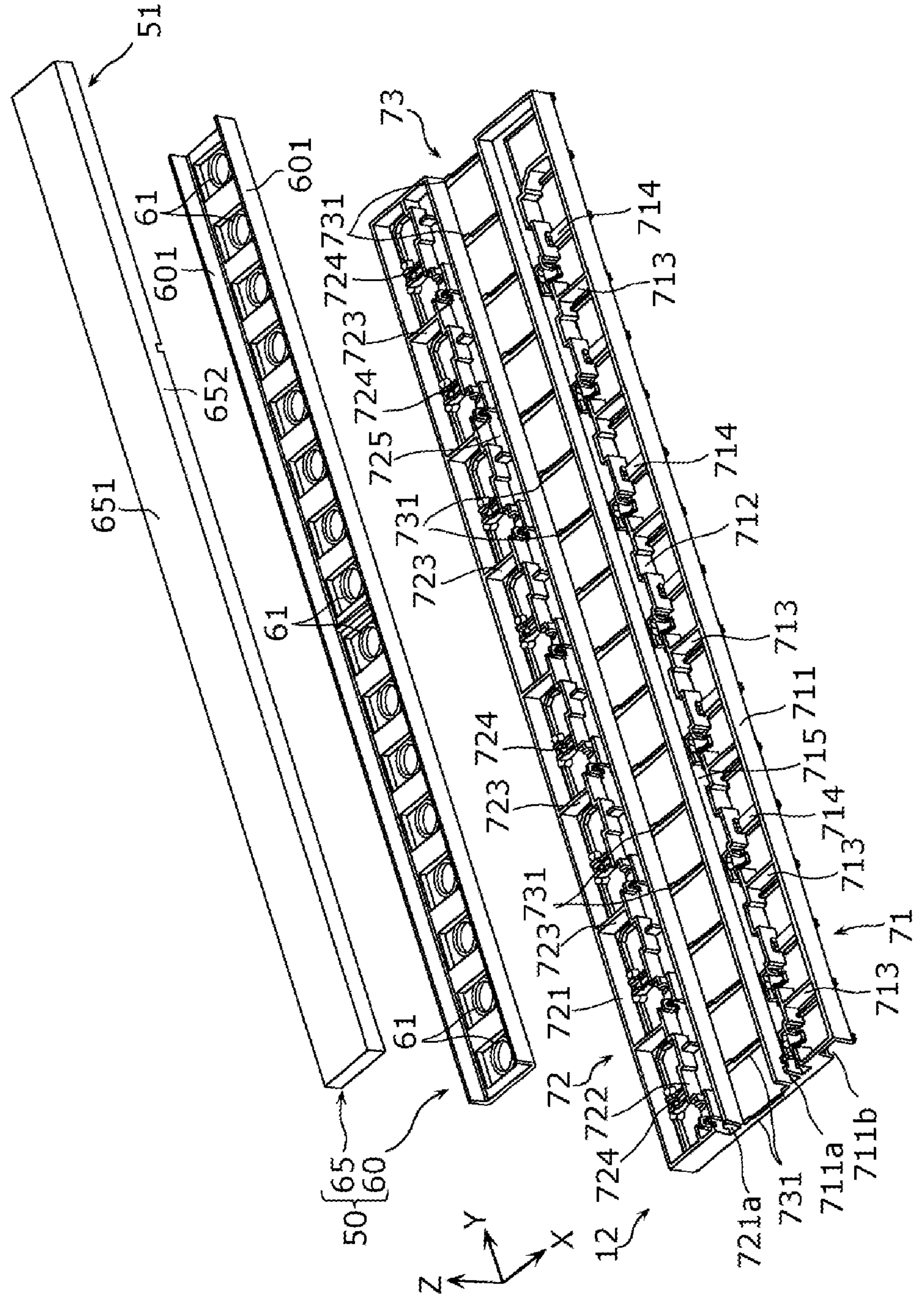
FIG. 6 is an exploded perspective view illustrating a schematic configuration of an exhaust portion and a bus bar frame according to the first embodiment.

Next, details of the bus bar frame 12 will be described. FIG. 6 is an exploded perspective view illustrating a schematic configuration of the exhaust portion 50 and bus bar frame 12 according to the first embodiment. FIG. 6 is a perspective view of the exhaust portion 50 and the bus bar frame 12 as viewed from above.

As illustrated in FIG. 6, the bus bar frame 12 is an example of a bus bar holding member that is disposed above the plurality of energy storage devices 11 and holds the plurality of bus bars 13. Specifically, the bus bar frame 12 includes a first holding portion 71, a second holding portion 72, and a connecting portion 73. Among the plurality of detection lines 13*a*, the plurality of detection lines 13*a* that are held by the first holding portion 71 are referred to as first detection lines. Among the plurality of detection lines 13*a*, the plurality of detection lines 13*a* that are held by the second holding portion 72 are referred to as second detection lines.

The first holding portion 71 is a portion of the bus bar frame 12 disposed on the X-axis plus direction side (one side). The first holding portion 71 holds the first bus bar group and the positive electrode power supply cable 31. The first holding portion 71 also holds the plurality of first detection lines that are connected to the electrode terminals (the positive electrode terminals 11*b* or the negative electrode terminals 11*c*) of the respective energy storage devices 11 in the X-axis plus direction or the bus bars 13 included in the first bus bar group.

The first holding portion 71 is disposed in the X-axis plus direction with respect to the gas release valves 111 of the respective energy storage devices 11. The first holding portion 71 includes: a first outer wall 711 that surrounds an outer periphery of the first holding portion 71; and a first surrounding wall 712 that surrounds the respective bus bars 13 together with the first outer wall 711.

A pair of first cutouts 711*a* and 711*b* is formed at an end of the first outer wall 711 in the Y-axis minus direction. Out of the pair of first cutouts 711*a* and 711*b*, in the first cutout 711*a* on one side, the positive electrode power supply cable 31 and the plurality of first detection lines are disposed such that the positive electrode power supply cable 31 and the plurality of first detection lines pass through the first cutout 711*a*. In the first cutout 711*b* on the other side, the negative electrode power supply cable 32 is disposed such that the negative electrode power supply cable 32 passes through the first cutout 711*b*.

The first surrounding wall 712 is disposed in the first outer wall 711 on the X-axis plus direction side. The first surrounding wall 712 is disposed in an elongated manner in the Y-axis direction. An end of the first surrounding wall 712 in the Y-axis plus direction is disposed between the energy storage device 11 at the end in the Y-axis plus direction and the energy storage device 11 disposed adjacently to the energy storage device 11 at the end in the Y-axis plus direction. An end of the first surrounding wall 712 in the Y-axis minus direction extends to an area in the vicinity of the first cutout 711*a* formed in the first outer wall 711.

In the first surrounding wall 712, a plurality of first partition walls 713 each of which is interposed between the respective bus bars 13, and a plurality of first partition portions 714 each of which is interposed between the energy storage devices 11 are disposed. The first partition walls 713 have a flat plate shape parallel to the XZ plane, and upper end faces of the first partition walls 713 are made coplanar with an upper end face of the first outer wall 711. The first partition portion 714 is a portion elongated in the X-axis direction, and is lower in height than the first partition wall 713. Each of the bus bars 13 is disposed so as to straddle over the corresponding first partition portion 714.

In the first outer wall 711, a region in the X-axis minus direction with respect to the first surrounding wall 712 forms a first cable path portion 715 that penetrates along the Y-axis direction. The first cable path portion 715 is disposed between the gas release valves 111 of the respective energy storage devices 11 and the respective bus bars 13 included in the first bus bar group. As described above, the first cable path portion 715 is disposed in the bus bar frame 12 inside the first bus bar group in the X-axis direction.

In the first cable path portion 715, the positive electrode power supply cable 31 and the plurality of first detection lines are disposed. The first cable path portion 715 forms a path for the positive electrode power supply cable 31 and the plurality of first detection lines. The plurality of first detection lines and the positive electrode power supply cable 31 are disposed in the first cable path portion 715. Accordingly, the first detection lines and the positive electrode power supply cable 31 are disposed while avoiding a space formed between the first holding portion 71 and the second holding portion 72, that is, a space above the connecting portion 73.

The second holding portion 72 is a portion of the bus bar frame 12 on the X-axis minus direction side (the other side). The second holding portion 72 holds the second bus bar group, and the plurality of second detection lines that are connected to the electrode terminals (the positive electrode terminals 11*b* or the negative electrode terminals 11*c*) of the respective energy storage devices 11 in the X-axis minus direction or the bus bars 13 included in the second bus bar group.

The second holding portion 72 is disposed in the X-axis minus direction with respect to the gas release valves 111 of the respective energy storage devices 11. The second holding portion 72 includes: a second outer wall 721 that surrounds an outer periphery of the second holding portion 72; and a second surrounding wall 722 that surrounds the respective bus bars 13 together with the second outer wall 721.

A second cutouts 721*a* is formed at an end of the second outer wall 721 in the Y-axis minus direction. The plurality of second detection lines are disposed in the second cutout 721*a* such that the plurality of second detection lines pass through the second cutout 721*a*.

The second surrounding wall 722 is disposed in the second outer wall 721 on the X-axis minus direction side. The second surrounding wall 722 is disposed in an elongated manner in the Y-axis direction. An end of the second surrounding wall 722 in the Y-axis plus direction is continuously formed with an end of the second outer wall 721 in the Y-axis plus direction. An end of the second surrounding wall 722 in the Y-axis minus direction extends to an area in the vicinity of the second cutout 721*a* formed in the second outer wall 721.

In a region of the second surrounding wall 722 in the X-axis minus direction, a plurality of second partition walls 723 each of which is interposed between the respective bus bars 13, and a plurality of second partition portions 724 each of which is interposed between the respective energy storage devices 11 are disposed. The second partition walls 723 have a flat plate shape parallel to the XZ plane, and upper end faces of the second partition walls 723 are made coplanar with an upper end face of the second outer wall 721. The second partition portion 724 is a portion elongated in the X-axis direction, and is lower in height than the second partition wall 723. Each of the bus bars 13 is disposed so as to straddle over the corresponding second partition portion 724.

In the second outer wall 721, a region in the X-axis plus direction with respect to the second surrounding wall 722 forms a second cable path portion 725 that penetrates along the Y-axis direction. The second cable path portion 725 is disposed between the gas release valves 111 of the respective energy storage devices 11 and the respective bus bars 13 included in the second bus bar group. As described above, the second cable path portion 725 is disposed in the bus bar frame 12 inside the second bus bar group in the X-axis direction.

A plurality of second detection lines are disposed in the second cable path portion 725. The plurality of second detection lines are disposed in the second cable path portion 725. Accordingly, the second detection lines are disposed while avoiding a space formed between the first holding portion 71 and the second holding portion 72, that is, a space above the connecting portion 73.

As illustrated in FIG. 6, a connecting portion 73 is a portion that connects the first holding portion 71 and the second holding portion 72 to each other. Specifically, the connecting portion 73 has a plurality of beam portions 731 that are elongated in the X-axis direction. One ends of the beam portions 731 are connected to the first holding portion 71 and the other ends of the beam portions 731 are connected to the second holding portion 72. The plurality of beam portions 731 are arranged at a predetermined interval in the Y-axis direction. The exhaust portion 50 is disposed above the plurality of beam portions 731. Among the plurality of beam portions 731, the beam portion 731 at an end in the Y-axis minus direction is disposed outside the energy storage device 11 at an end in the Y-axis minus direction. The beam portion 731 at an end in the Y-axis plus direction is disposed outside the energy storage device 11 at an end in the Y-axis plus direction. With respect to the beam portions 731 other than these beam portions 731, each beam portion 731 is arranged between the pair of energy storage devices 11 disposed adjacently to each other. In this manner, the plurality of beam portions 731 are disposed at positions retracted from the gas release valves 111 of the respective energy storage devices 11. In other words, the gas release valves 111 of the respective energy storage devices 11 are exposed from the plurality of beam portions 731 as viewed in a top plan view.

[5 Exhaust Portion]

Figure 7:
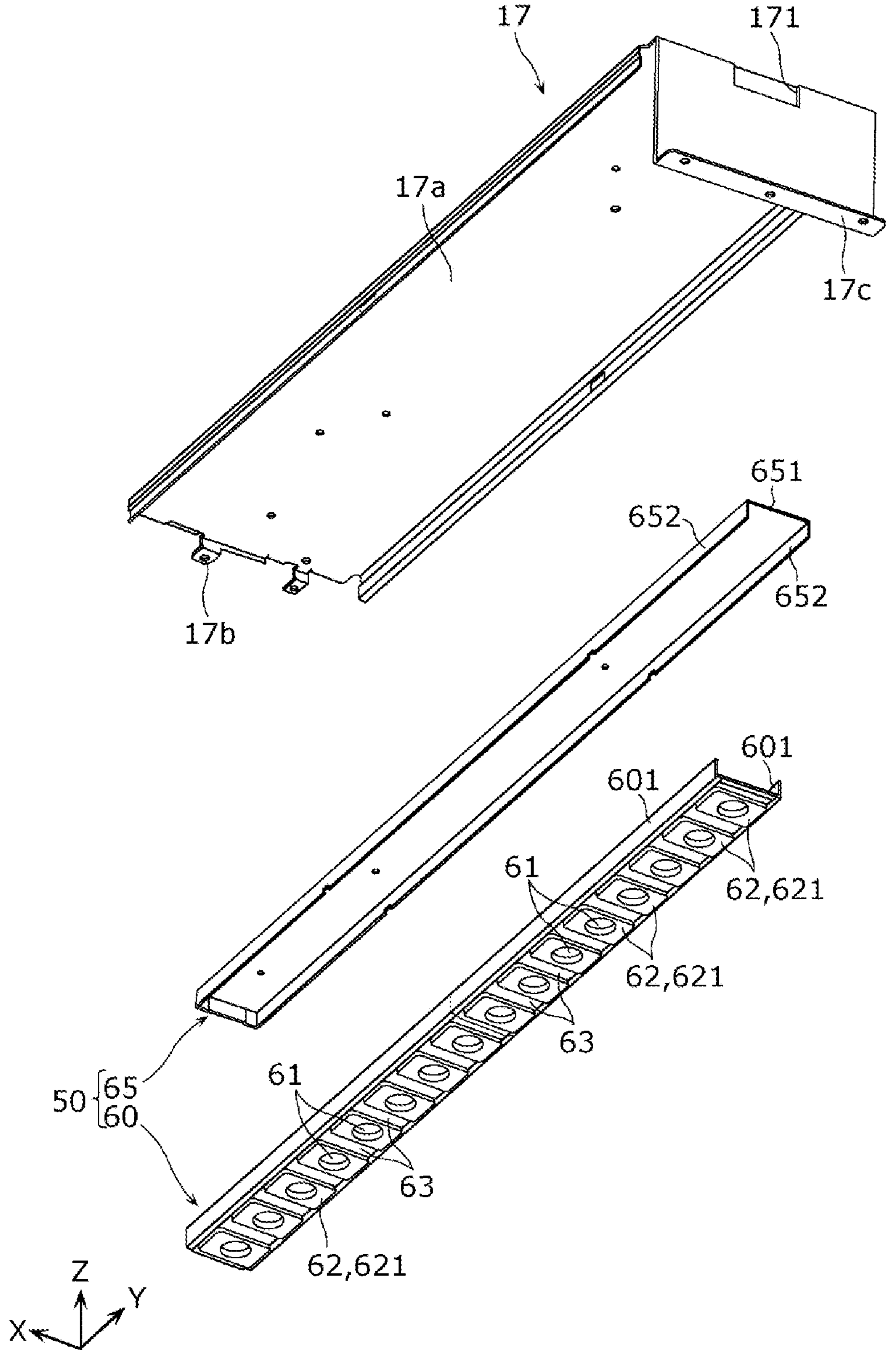
FIG. 7 is an exploded perspective view illustrating a schematic configuration of the exhaust portion and an outer case lid according to the first embodiment.
Figure 8:
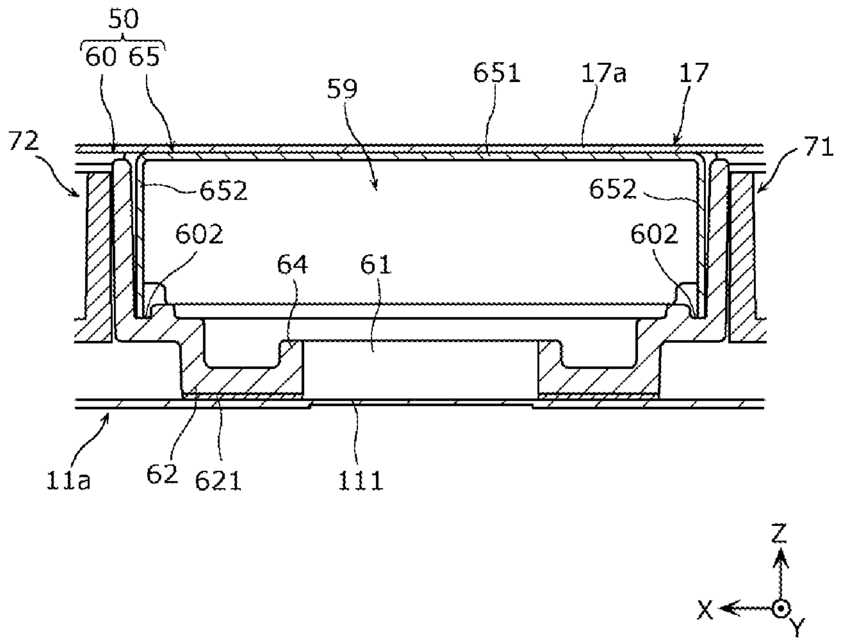
FIG. 8 is a cross-sectional view illustrating a schematic configuration of the exhaust portion and an energy storage device according to the first embodiment.

FIG. 7 is an exploded perspective view illustrating a schematic configuration of the exhaust portion 50 and the outer case lid 17 according to the first embodiment. Specifically, FIG. 7 is a perspective view of the exhaust portion 50 and the outer case lid 17 as viewed from below. FIG. 8 is a cross-sectional view illustrating the schematic configuration of the exhaust portion 50 and the energy storage device 11 according to the first embodiment.

As illustrated in FIG. 6 to FIG. 8, the exhaust portion 50 includes an exhaust member 60 and a lid member 65. The exhaust member 60 is disposed just above the gas release valves 111 of the respective energy storage devices 11 in a state where the exhaust member 60 is supported by the bus bar frame 12 as a whole. The exhaust member 60 is formed in a shape where an upper side is opened as viewed in the Y-axis direction, and is a member made of resin and elongated in the Y-axis direction. The length of the exhaust member 60 in the Y-axis direction corresponds to the entire length of the outer case body 14 in the Y-axis direction. Accordingly, the entire exhaust member 60 can be accommodated in the outer case body 14.

A pair of wall portions 601 is formed on upper surface of a bottom portion of the exhaust member 60 at both ends in the X-axis direction. The respective wall portions 601 are formed substantially parallel to the YZ plane. Grooves 602 extending along the Y-axis direction are formed on the upper surface of the bottom portion in the vicinity of the respective wall portions 601. Each wall portion 652 of the lid member 65 is disposed in each groove 602.

A plurality of holes 61 through which the gas release valves 111 of the respective energy storage devices 11 are exposed are formed in a central portion of the bottom portion of the exhaust member 60 in the X-axis direction. A plurality of contact portions 62 are formed on an outer bottom surface of the exhaust member 60 in a protruding manner. Each contact portion 62 continuously surrounds the entire circumference of each hole 61. A flat plate-shaped elastic body 621 such as rubber is stacked on a lower surface of each contact portion 62. Each contact portion 62 has substantially a rectangular outer shape as viewed in a plan view. The contact portions 62 are arranged at a predetermined interval in the Y-axis direction. A groove 63 extending in the X-axis direction is formed between the contact portions 62. By forming the groove 63, the respective contact portions 62 can be defined from each other. Accordingly, the contact portions 62 having a convex shape can be easily formed.

As illustrated in FIG. 8, the contact portion 62 is a convex portion that protrudes toward the energy storage device 11. A distal end face (lower end face) of the contact portion 62 is brought into contact with a lid of the case 11*a* of the energy storage device 11. Specifically, the contact portion 62 is brought into close contact with the lid of the case 11*a* in a state where an elastic body 621 is compressed. The contact portion 62 surrounds the entire circumference of the gas release valve 111 that is mounted on a lid. The elastic body 621 seals a boundary between the gas release valve 111 and the hole 61. The hole 61 is formed longer than the gas release valve 111 in the arrangement direction (X-axis direction) of the plurality of electrode terminals (the positive electrode terminals 11*b* and the negative electrode terminals 11*c*) mounted on the energy storage devices 11. The hole 61 may have the same shape as the gas release valve 111.

The size of the energy storage device 11 in the Y-axis direction is smaller than the size of the energy storage device 11 in the X-axis direction. That is, it is difficult to enlarge the hole 61 in the Y-axis direction. On the other hand, the hole 61 can be made larger in the X-axis direction and hence, the hole 61 is made longer than the gas release valve 111. As a result, when the gas release valve 111 is opened, the blocking of the opening by the hole 61 can be suppressed and hence, smooth gas discharging can be performed. When the hole 61 has the shape larger than the shape of the gas release valve 111 as a whole, the smoother gas discharging can be acquired.

A peripheral edge of the hole 61 in the Z-axis plus direction forms an annular portion 64 that protrudes toward a lid member 65 side over the entire circumference. The annular portion 64 is continuously formed over the entire circumference. With the formation of the annular portion 64, not only the peripheral edge of the hole 61 is reinforced, but also it is also possible to suppress melting of the entire peripheral edge of the hole 61 even when the hole 61 is exposed to a high-temperature gas.

The exhaust member 60 may be made of resin having higher heat resistance than the bus bar frame 12. When the bus bar frame 12 is made of PP, the exhaust member 60 may be made of polyphenylene sulfide (PPS) having higher heat resistance than polypropylene (PP). When the bus bar frame and the exhaust member are integrally molded using a single resin, it is necessary to mold the entirety of the bus bar frame and the exhaust member using a resin having high heat resistance. However, in the present embodiment, it is sufficient to form only the exhaust member 60 that is a separate body from the bus bar frame 12 using a resin having high heat resistance. Accordingly, a use amount of the resin can be suppressed.

As illustrated in FIG. 6 to FIG. 8, the lid member 65 is disposed above the exhaust member 60, and closes the open portion of the exhaust member 60. Specifically, the lid member 65 is made of metal, and has higher heat radiation property than the exhaust member 60. The lid member 65 is formed in a shape where a lower side is opened as viewed in the Y-axis direction. The lid member 65 is a member elongated in the Y-axis direction.

The lid member 65 includes a top plate portion 651 and a pair of wall portions 652. The top plate portion 651 is a rectangular plate elongated parallelly to the XY plane. The pair of wall portions 652 is formed on a lower surface of the top plate portion 651 at both ends of the top plate portion 651 in the X-axis direction. The respective wall portions 652 are formed substantially parallel to the YZ plane. Lower ends of the respective wall portions 652 are brought into contact with bottom surfaces of the grooves 602 formed on the exhaust member 60. As described above, the lower ends of the respective wall portions 652 are brought into contact with the bottom surfaces of the grooves 602 in a state of being accommodated in the grooves 602. Accordingly, it is possible to enhance the sealability between the respective wall portions 652 and the exhaust member 60 as compared with a case where the lower ends of the respective wall portions 652 are brought into contact with a flat surface. In such a state, the top plate portion 651 of the lid member 65 is disposed above the pair of wall portions 601 of the exhaust member 60. Therefore, the top plate portion 651 of the lid member 65 is pressed downward by the top surface portion 17*a* of the outer case lid 17. The pair of wall portions 652 of the lid member 65 is pressed against the bottom surfaces of the grooves 602 by such a pressing force, higher sealability can be acquired. When a gas is released from the gas release valve 111 of the energy storage device 11, the lid member 65 receives the gas. Accordingly, there is a possibility that the lid member 65 lifts. The lid member 65 receives a downward pressing force from the outer case lid 17 and hence, it is possible to suppress lifting of the lid member 65 caused by releasing of a gas.

A pressing force directed downward from the pair of wall portions 652 of the lid member 65 also acts on the exhaust member 60. Accordingly, the exhaust member 60 presses the plurality of energy storage devices 11 downward. With such a configuration, the elastic bodies 621 of the exhaust member 60 can be compressed with certainty and hence, the higher close contact property can be acquired. With such a pressing force, it is also possible to suppress the positional displacement of the plurality of energy storage devices 11 in the vertical direction.

A length of the lid member 65 in the Y-axis direction is longer than an entire length of the exhaust member 60 in the Y-axis direction. Therefore, it is possible to make one end of the lid member 65 in the Y-axis plus direction protrude from the exhaust member 60.

One end of the lid member 65 in the Y-axis plus direction is opened downward and a distal end face is also opened in a state where one end of the lid member 65 protrudes from the exhaust member 60. On the other hand, the other end of the lid member 65 is closed so that discharging of a gas is prevented. The lid member 65 forms an exhaust path 59 for a gas together with the exhaust member 60 in a state where the lid member 65 is accommodated in the exhaust member 60. A gas is discharged from the open portion at one end of the lid member 65 described above. That is, one end of the lid member 65 is the exhaust port portion 51 from which the gas is discharged. That is, the exhaust port portion 51 has a shape where one end is opened as viewed in a gas advancing direction. Specifically, the exhaust port portion 51 has a shape where the opening portion faces downward.

Figure 9:
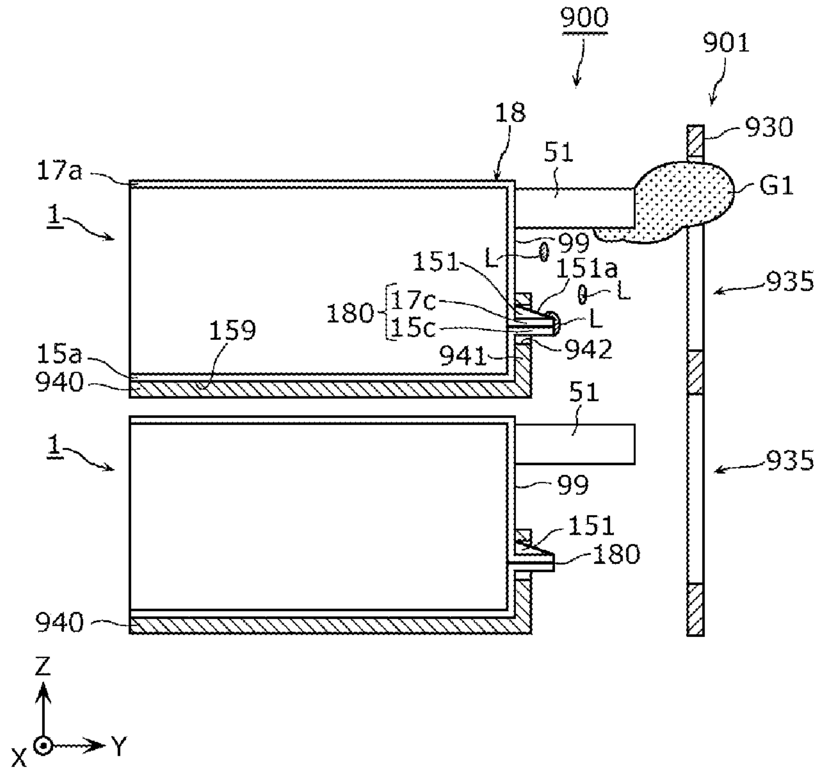
FIG. 9 is a side view illustrating a schematic configuration of an exhaust port portion according to the first embodiment.

FIG. 9 is a side view illustrating a schematic configuration of the exhaust port portion 51 according to the first embodiment. In FIG. 9, two energy storage apparatuses 1 arranged vertically are illustrated in a side view, and the shelf plate 940 and a rear cover 930 are illustrated in a cross-sectional view.

The exhaust port portions 51 protrude outward from the end of the bus bar frame 12 and the ends of the outer cases 18 in the Y-axis plus direction. The exhaust port portions 51 protrude outward from ends of the shelf plates 940 in the Y-axis plus direction.

A gas discharged from the gas release valves 111 of the respective energy storage devices 11 enters the exhaust path 59 defined by the exhaust member 60 and the lid member 65 through the holes 61 formed in the exhaust member 60. Thereafter, the gas passes through the exhaust path 59 and is discharged to the outside of the energy storage unit 10 from the exhaust port portion 51 disposed outside the outer case 18. As described above, in the exhaust port portion 51, the distal end and the lower portion are opened. Accordingly, a gas G1 is released from these opening portions.

Figure 10:
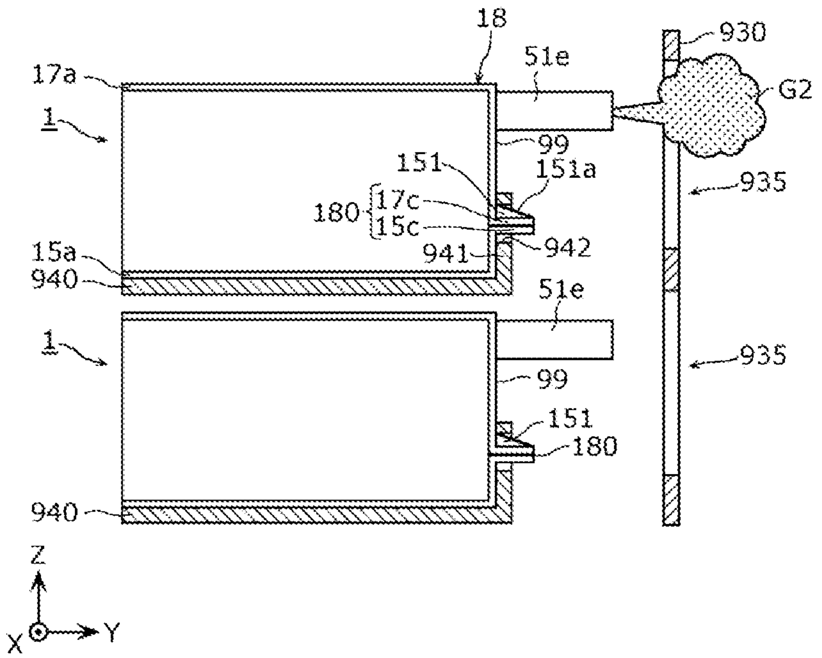
FIG. 10 is a side view illustrating a gas discharged from an exhaust port portion of a comparative example.

FIG. 10 is a side view illustrating a gas G2 discharged from an exhaust port portion 51*e* of a comparative example. FIG. 10 is a view corresponding to FIG. 9. The exhaust port portion 51*e* of the comparative example is different from the exhaust port portion 51 according to the present embodiment with respect to a point that a lower portion is closed and only a distal end is opened. With such a configuration, the gas G2 is energetically jetted from the distal end of the exhaust port portion 51*e*. Due to this flow energy of the gas G2, the gas G2 impinges on other devices (facilities such as other power storage facilities) in the vicinity of the energy storage facility 900 through the slit group 935 formed in the rear cover 930. As a result, there is a possibility that the gas G2 adversely affects other devices.

On the other hand, as illustrated in FIG. 9, in the exhaust port portion 51 according to the present embodiment, the gas G1 is released from the opened distal end and the lower portion. Accordingly, the energy that the gas G1 possesses at the time of releasing is dispersed. As a result, the gas G1 is less likely to reach other devices and hence, adverse effects brought about by the gas G1 on other devices can be suppressed.

[6 Protruding Portion]

Figure 11:
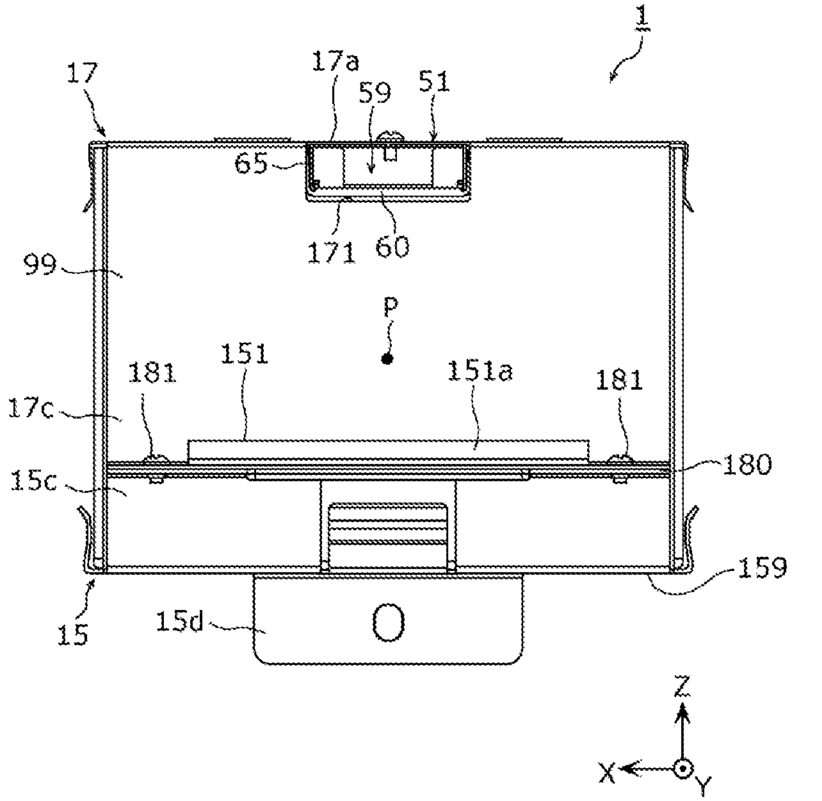
FIG. 11 is a plan view illustrating a schematic configuration of a protruding portion according to the first embodiment.

Next, details of the protruding portion 180 will be described. FIG. 11 is a plan view illustrating a schematic configuration of the protruding portion 180 according to the first embodiment. As illustrated in FIG. 3, FIG. 9, and FIG. 11, the protruding portion 180 is an example of an eaves portion that protrudes in the Y-axis plus direction from one end face 99 of the energy storage apparatus 1 in the Y-axis plus direction. As described above, the protruding portion 180 is a portion formed by connecting the connecting portion 15*c* of the outer case support 15 and the connecting portion 17*c* of the outer case lid 17 to each other. The connecting portion 15*c* and the connecting portion 17*c* are fastened to each other by screws 181 in a state where the connecting portion 15*c* and the connecting portion 17*c* are stacked in the vertical direction. Specifically, the connecting portion 15*c* and the connecting portion 17*c* each have a rectangular plate-shaped portion that is parallel to the XY plane and is elongated in the X-axis direction. An elastic body 151 made of rubber is attached to an upper surface of the connecting portion 17*c*. The elastic body 151 is disposed at a position corresponding to the serrated structure 943 of the shelf plate 940. The elastic body 151 is a triangular prism-shaped member elongated in the X-axis direction. The elastic body 151 is disposed on the connecting portion 17*c* in such a manner that the elastic body 151 is tapered. That is, the elastic body 151 has an inclined surface 151*a* that approaches an upper surface of the connecting portion 17*c* as the elastic body 151 extends in the Y-axis plus direction. With such a configuration, the protruding portion 180 has a tapered shape where the protruding portion 180 becomes thinner in the thickness direction (Z-axis direction) as the protruding portion 180 extends toward the front. In setting the energy storage apparatus 1 on the shelf plate 940, the energy storage apparatus 1 is made to slide on the shelf plate 940 from the Y-axis minus direction side with respect to the support hole 942. Accordingly, the protruding portion 180 is inserted into the support hole 942. The protruding portion 180 has a tapered shape and hence, the protruding portion can be smoothly inserted into the support hole 942. Accordingly, operability at the time of inserting the protruding portion 180 can be enhanced.

The elastic body 151 is disposed in a range longer than a range of the serrated structure 943 in the X-axis direction. With such a configuration, when the protruding portion 180 is inserted into the support hole 942 formed in the shelf plate 940, the entire serrated structure 943 meshes with the elastic body 151.

There may be a case where an electrolyte solution is discharged from the gas release valve 111 of the energy storage device 11, or a discharged gas may return to an electrolyte solution by being cooled in the exhaust path 59. That is, as illustrated in FIG. 9, there may by a case where an electrolyte solution L may fall from the opening portion formed on the lower portion of the exhaust port portion 51. The protruding portion 180 is disposed between the mounting surface 159 of the energy storage apparatus 1 and the exhaust port portion 51. Accordingly, the protruding portion 180 can receive the electrolyte solution L. Specifically, the elastic body 151 that is attached to the protruding portion 180 is disposed below the exhaust port portion 51 and hence, the inclined surface 151*a* of the elastic body 151 receives the electrolyte solution L. The electrolyte solution L is guided in the Y-axis plus direction by the inclined surface 151*a* of the elastic body 151. Accordingly, the electrolyte solution L having a high temperature is separated from one end face 99 of the energy storage apparatus 1.

Depending on a situation, it is also estimated that the electrolyte solution L flows toward the Y-axis minus direction side on the protruding portion 180. The protruding portion 180 is formed of the connecting portion 17*c* of the outer case lid 17 that covers the energy storage device 11 from above. Accordingly, even when the electrolyte solution L flows toward the Y-axis minus direction side (energy storage device 11 side) on the protruding portion 180, the outer case lid 17 itself forms a wall so that the further advancing of the electrolyte solution L can be suppressed. Even when the electrolyte solution L is brought into contact with the outer case lid 17, the electrolyte solution L does not advance to members (the energy storage device 11, the outer case body 14, and the like) disposed inside the outer case lid 17.

Specifically, in the embodiment, the exhaust port portion 51 protrudes more outward than the protruding portion 180. Accordingly, the gas G1 and the electrolyte solution L that have passed through the exhaust path 59 are discharged at a position away from the protruding portion 180. Specifically, there may be a case where a portion of the electrolyte solution L receives a flow energy of the gas G1 so that the portion of the electrolyte solution L gradually moves downward while moving in the Y-axis plus direction on an inner surface of the exhaust port portion 51. That is, the electrolyte solution L having a high temperature is minimally discharged in the vicinity of the energy storage apparatus 1, and also minimally falls on the protruding portion 180. As a result, the burning of the energy storage apparatus 1 caused by an electrolyte solution L can be suppressed and hence, safety can be further enhanced.

As illustrated in FIG. 11, in a plan view of one end face 99 of the energy storage apparatus 1, using the center P of one end face 99 as the reference, the protruding portion 180 is disposed below the center P, and the exhaust port portion 51 is disposed above the center P. In this manner, the exhaust port portion 51 is disposed on the upper portion of one end face 99, and the protruding portion 180 is disposed on the lower portion of one end face 99. Accordingly, a falling path of the electrolyte solution L that falls from the exhaust port portion 51 to the protruding portion 180 can be elongated. Therefore, the time during which the electrolyte solution L is brought into contact with air can be prolonged and hence, the electrolyte solution L can be cooled as much as possible. As a result, a temperature of the electrolyte solution L when the electrolyte solution L is brought into contact with the protruding portion 180 can be lowered. Accordingly, the thermal deformation of the protruding portion 180 can be suppressed.

[7 Description of Advantageous Effects]

As has been described above, the energy storage apparatus 1 according to the embodiment includes: the plurality of energy storage devices 11 each having the gas release valve 111, the plurality of energy storage devices 11 being arranged in a posture where the gas release valves 111 are directed in the same direction; the exhaust portion 50 disposed on the gas release valves 111 of the plurality of respective energy storage devices 11, the exhaust portion 50 forming the exhaust path 59 for the gas G1 discharged from the gas release valves 111; and the outer case 18 (housing) accommodating the plurality of the energy storage devices 11 and the exhaust portion 50, wherein a portion of the exhaust portion 50 is the exhaust port portion 51 that protrudes from the outer case 18 and forms an exit portion of the exhaust path 59, and the exhaust port portion 51 has the shape where one end of the exhaust port portion 51 is opened as viewed in an advancing direction of the gas G1, and protrudes more outward than the shelf plate 940 (support member) that supports the energy storage devices 11 from below.

In such a configuration, the exhaust port portion 51 has the shape where one end of the exhaust port portion 51 is opened as viewed in an advancing direction of the gas G1. That is, the exhaust port portion 51 has the shape where a part of the exhaust port portion 51 is opened and hence, the gas G1 is discharged also from the opening portion. Therefore, the gas G1 can be discharged to the outside in a diffused manner and hence, it is possible to prevent the gas G1 from being intensively jetted to another apparatus disposed adjacently to the energy storage apparatus 1. Therefore, it is possible to suppress an adverse effect on other apparatuses at the time of gas discharging.

A deposit that is caused by the gas G1 is minimally accumulated in the exhaust port portion 51 and hence, the clogging of the exhaust path 59 can be suppressed. Accordingly, it is possible to maintain the smooth discharging of the gas G1. Accordingly, it is possible to provide the energy storage apparatus 1 having higher safety.

The exhaust port portion 51 protrudes more outward than the shelf plate 940. Accordingly, the gas G1 and the electrolyte solution L can be guided by the exhaust port portion 51 to the position away from the shelf plate 940. That is, the electrolyte solution L having a high temperature is minimally discharged in the vicinity of the energy storage apparatus 1, and also minimally falls on the shelf plate 940. As a result, the burning of the energy storage apparatus 1 caused by the electrolyte solution L can be suppressed.

The opening portion of the exhaust port portion 51 is directed downward.

With such a configuration, the opening portion of the exhaust port portion 51 is directed downward and hence, it is possible to make the discharged electrolyte solution L easily fall downward below the exhaust port portion 51. Therefore, a deposit that is discharged from the energy storage device 11 is minimally accumulated in the exhaust port portion 51 and hence, the clogging of the exhaust path 59 can be suppressed with more certainty. Accordingly, safety can be further enhanced.

In the above-described configuration, the exhaust port portion 51 protrudes more outward than the protruding portion 180 and hence, the electrolyte solution L dripped from the opening portion of the exhaust port portion 51 can be received by the protruding portion 180. The electrolyte solution L is guided further outward by the protruding portion 180 and hence, the electrolyte solution L is away from one end face 99 of the outer case 18. That is, the electrolyte solution having a high temperature can be minimally brought into contact with one end face 99 of the outer case 18. Accordingly, the ignition of the outer case 18 caused by the electrolyte solution L can be suppressed. Accordingly, safety can be further enhanced.

According to the energy storage apparatus 1 of the present embodiment, in the energy storage facility 900 that includes: the energy storage apparatus 1 that includes the plurality of energy storage devices 11; and the shelf plate 940 (support member) that supports the energy storage apparatus 1, wherein the energy storage apparatus includes the protruding portion 180 that protrudes in the predetermined direction from one end face 99 of the energy storage apparatus 1 in the predetermined direction, and the shelf plate 940 has the support hole 942 into which the protruding portion 180 is inserted from the predetermined direction.

With such a configuration, the protruding portion 180 that is provided to one end face 99 of the energy storage apparatus 1 protrudes from one end face 99. Accordingly, in the case where the energy storage apparatus 1 is accommodated by sliding the energy storage apparatus 1 from the predetermined direction with respect to the shelf plate 940, the protruding portion 180 can be easily inserted into the support hole 942. At the time of inserting the protruding portion 180, the positioning operation is difficult because of the presence of a restriction on space on one end side that is the depth side. However, in the case where the protruding portion 180 can be inserted into the support hole 942 only by the above-described sliding operation, the positioning operation can be facilitated.

After the insertion, the protruding portion 180 is brought into contact with the support hole 942. Accordingly, the movement of the energy storage apparatus 1 can be restricted. In this manner, the movement of the energy storage apparatus 1 with respect to the shelf plate 940 can be easily restricted.

The protruding portion 180 can be used as a handle and hence, a member dedicated to be used as a handle is unnecessary.

The energy storage apparatus 1 includes the outer case 18 (housing) that covers the plurality of energy storage devices 11, and the outer case 18 includes the protruding portion 180.

With such a configuration, the protruding portion 180 formed on the outer case 18 can be inserted into the support hole 942. Therefore, the positioning can be performed by the protruding portion 180 that possesses functions other than the positioning function that the outer case body 18 originally possesses. That is, one protruding portion 180 can be used for performing a plurality of functions. Accordingly, compared with a case where dedicated members are provided for performing respective functions, the number of components can be reduced and hence, the downsizing and the reduction of weight can be realized. Accordingly, handling of the energy storage apparatus 1 itself at the time of performing the positioning operation can be facilitated.

The protruding portion 180 has a tapered shape where a side of the protruding portion 180 becomes thinner toward a distal end of the protruding portion 180.

With such a configuration, the protruding portion 180 has a tapered shape and hence, the protruding portion 180 can be easily inserted into the support hole 942. As a result, operability at the time of insertion is enhanced and hence, the protruding portion 180 can be more reliably inserted into the support hole 942.

The protruding portion 180 has the elastic body 151 that is pressed by the support hole 942 when the protruding portion 180 is inserted into the support hole 942.

With such a configuration, the protruding portion 180 includes the elastic body 151 that is pressed by the support hole 942. Accordingly, in a state where the protruding portion 180 is inserted into the support hole 942, the elastic body 151 is elastically deformed and meshes with the support hole 942. Accordingly, the positioning with respect to the support hole 942 can be strengthened. As a result, the movement of the energy storage apparatus 1 with respect to the shelf plate 940 can be easily restricted with more certainty.

The serrated structure 943 that is brought into contact with the protruding portion 180 is formed on the peripheral edge of the support hole 942.

With such a configuration, the serrated structure 943 formed on the peripheral edge of the support hole 942 is brought into contact with the protruding portion 180 and hence, the joining between the protruding portion 180 and the support hole 942 can be further strengthened. As a result, the movement of the energy storage apparatus 1 with respect to the shelf plate 940 can be easily restricted with more certainty.

In the energy storage apparatus 1, the fixing portion **15*d* (the end on the other end side in the predetermined direction) is fixed to the shelf plate 940** member.

With such a configuration, in the energy storage apparatus, the fixing portion **15*d* that forms the end on the other end side is fixed to the shelf plate 940. Accordingly, when the energy storage apparatus 1 is accommodated by sliding the energy storage apparatus 1 with respect to the shelf plate 940 from a predetermined direction, the fixing portion 15*d* that forms the front side can be easily fixed to the shelf plate 940 by screwing. The energy storage apparatus can be fixed to the shelf plate 940 by the fixing portion 15*d*** disposed on the other end side that has less restriction on space than the one end side (back side). Accordingly, the fixing operation can be facilitated.

In the present energy storage apparatus 1 according to the embodiment, the energy storage apparatus 1 includes: the plurality of energy storage devices 11 arranged along a predetermined direction and each having the gas release valve 111; the exhaust portion 50 disposed on the respective gas release valves 111 of the plurality of energy storage devices 11 and forming the exhaust path 59 for a gas discharged from the gas release valves 111; and the outer case lid 17 (first reinforcing member) that covers the upper side of the plurality of energy storage devices 11, wherein on one end face 99 of the energy storage apparatus 1 in the predetermined direction, the exhaust port portion 51 of the exhaust path 59 and the protruding portion 180 (eaves portion) that protrudes from one end face 99 in the predetermined direction are provided, and the protruding portion 180 is formed of the connecting portion 17*c* (one end) of the outer case lid 17 and is disposed between the exhaust port portion 51 and the mounting surface 159 of the energy storage apparatus 1.

With such a configuration, the protruding portion 180 is disposed between the exhaust port portion 51 and the mounting surface 159. Accordingly, an electrolyte solution L discharged from the exhaust port portion 51 can be received by the protruding portion 180. The electrolyte solution L is guided in the predetermined direction by the protruding portion 180. Accordingly, the electrolyte solution L is away from one end face 99 of the energy storage apparatus 1. Therefore, it is possible to make it difficult for an electrolyte solution L having a high temperature to come into contact with one end face 99 of the energy storage apparatus 1.

The protruding portion 180 is formed of the connecting portion 17*c* of the outer case lid 17 that covers the plurality of the energy storage devices 11 from above. Accordingly, even when the electrolyte solution L flows toward the energy storage device 11 on the protruding portion 180, the outer case lid 17 itself forms a wall so that the further advancing of the electrolyte solution L can be suppressed. Even when the electrolyte solution is brought into contact with one end face 99 of the energy storage apparatus 1, the electrolyte solution L does not advance to members (the energy storage device 11, the outer case body 14, and the like) disposed inside the outer case lid 17. As a result, the ignition in the energy storage apparatus 1 caused by the electrolyte solution L can be suppressed and hence, safety can be enhanced.

The energy storage apparatus 1 includes the protruding portion 180 (eaves portion) that protrudes from one end face 99 of the outer case 18 on which the exhaust port portion 51 is disposed, and is disposed between the exhaust port portion 51 and the shelf plate 940. The exhaust port portion 51 protrudes more outward than the protruding portion 180.

In a plan view of one end face 99 of the energy storage apparatus 1, the exhaust port portion 51 is disposed above the center P of one end face 99. In a plan view of one end face 99 of the energy storage apparatus 1, the protruding portion 180 is disposed below the center P of one end face 99.

With such a configuration, the exhaust port portion is disposed on an upper portion of one end face 99, and the protruding portion 180 is disposed on a lower portion of the one end face 99. Accordingly, a fall path for the electrolyte solution L through which the electrolyte solution L falls from the exhaust port portion 51 and reaches the protruding portion 180 can be elongated. Therefore, the time during which the electrolyte solution L is brought into contact with air can be prolonged and hence, the electrolyte solution L can be cooled as much as possible. As a result, a temperature of the electrolyte solution L when the electrolyte solution L comes into contact with the protruding portion 180 can be lowered and hence, the thermal deformation and the burning of the protruding portion 180 can be suppressed. As a result, safety can be further enhanced.

The energy storage apparatus 1 includes the outer case support 15 (second reinforcing member) that is disposed below the plurality of energy storage devices 11 and reinforces the plurality of energy storage devices 11 by sandwiching the plurality of energy storage devices 11 together with the outer case lid 17. The connecting portion (the connecting portions 15*c* and 17*c*) that connects one end of the outer case lid 17 and one end of the outer case support 15 to each other forms the protruding portion 180. The exhaust portion 50 is pressed by the outer case lid 17.

With such a configuration, the exhaust portion 50 is pressed by the outer case lid 17. Accordingly, even when the exhaust portion 50 intends to lift due to discharging of a gas from the gas release valve 111, lifting of the exhaust portion 50 can be suppressed by the outer case lid 17. As described above, the outer case lid 17 has both the function of the eaves portion and the function of suppressing lifting of the exhaust portion 50. Accordingly, compared with the case where dedicated members are provided for realizing these functions respectively, the number of components can be reduced. If the number of components can be reduced, the number of components that have possibility of burning can be reduced and hence, safety can be improved.

The exhaust portion 50 presses the plurality of energy storage devices 11 by a pressing force that the exhaust portion 50 receives from the outer case lid 17.

With such a configuration, the exhaust portion 50 presses the plurality of energy storage devices 11 by the pressing force that the exhaust portion 50 receives from the outer case lid 17. Accordingly, it is possible to suppress the positional displacement of the plurality of energy storage devices 11 in the vertical direction. As described above, the outer case lid 17 has the function of suppressing the positional displacement of the energy storage devices 11 in addition to the function of the eaves portion and the function of suppressing lifting of the exhaust portion 50. Accordingly, compared with the case where dedicated members are provided for realizing these functions respectively, the number of components can be reduced. If the number of components can be reduced, the number of components that have possibility of burning can be reduced and hence, safety can be improved.

Second Embodiment

In the above-described first embodiment, the case has been exemplified where the opening portion of the exhaust port portion 51 faces downward as viewed in the gas advancing direction. In the second embodiment, a case is exemplified where the opening portion of the exhaust port portion faces upward as viewed in the gas advancing direction. In the following description, components equivalent to the components in the first embodiment are denoted by the same reference numerals, and the description of these components may be omitted.

Figure 12:
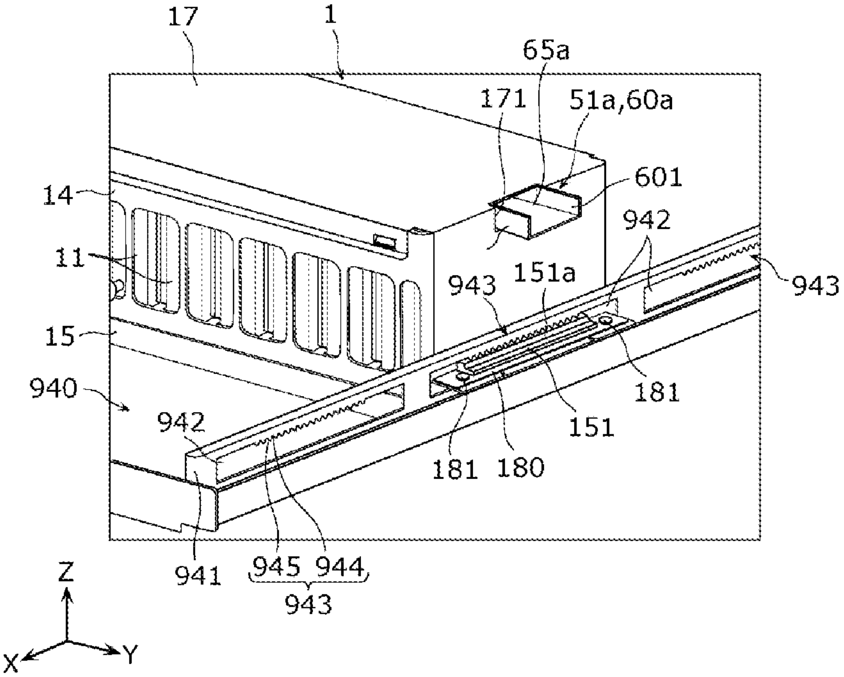
FIG. 12 is a perspective view illustrating a schematic configuration of an exhaust port portion according to a second embodiment.

FIG. 12 is a perspective view illustrating a schematic configuration of an exhaust port portion 51*a* according to the second embodiment. Specifically, FIG. 12 is a view corresponding to FIG. 3. As illustrated in FIG. 12, one end of an exhaust member 60*a* protrudes from an opening portion 171 of an outer case lid 17, and one end of a lid member 65*a* is accommodated in the outer case lid 17. One end of the exhaust member 60*a* protruding from the opening portion 171 forms the exhaust port portion 51*a*. In this embodiment, the exhaust port portion 51*a* is fixed to the outer case lid 17 by welding, screwing, or the like. In such a configuration, the exhaust port portion 51*a* has a shape where an upper side of the exhaust port portion 51*a* is opened as viewed in the Y-axis direction. It is sufficient that the exhaust port portion 51*a* has a structure where the upper side of the exhaust port portion 51*a* is opened. The material, the configuration, and the manufacturing method of the exhaust port portion 51*a* are not limited. For example, another U-shaped member may be connected to the outer case lid 17 by welding, screwing, or the like.

With such a configuration, the exhaust port portion 51*a* protrudes more outward than a shelf plate 940, and the opening portion of the exhaust port portion 51*a* is directed upward. Accordingly, it is possible to guide a gas and an electrolyte solution to a position away from the shelf plate 940 by the exhaust port portion 51*a*. A gas easily rises and hence, the gas is discharged while being diffused in the open portion above the exhaust port portion 51*a* immediately after passing through the opening portion 171. As a result, it is possible to make the gas minimally impinge on another apparatus disposed adjacently to the energy storage facility 900.

If the gas and the electrolyte solution can be guided to a position away from the shelf plate 940 by the exhaust port portion 51*a*, the electrolyte solution L having a high temperature is less likely to be discharged to an area in the vicinity of the energy storage apparatus 1 and is also less likely to fall on the shelf plate 940. As a result, the burning of the energy storage apparatus 1 caused by an electrolyte solution L can be suppressed and hence, safety can be further enhanced.

The direction of the opening portion in the exhaust port portion may be the direction other than the upward direction and the downward direction. As other directions of the opening portion in the exhaust port portion, the X-axis plus direction, the X-axis minus direction, and the like can be named.

Further, an outer shape of the exhaust port portion as viewed in an advancing direction of the gas G1 may be any shape. That is, instead of the above-described rectangular shape, a triangular shape, a trapezoidal shape, a circular shape, a semicircular shape, and the like can be adopted.

Third Embodiment

In the above-described first embodiment, the case is exemplified where one end face 99 of the energy storage apparatus 1 is exposed in the rack 901. In the third embodiment, an energy storage facility 900B in which the wall 980 covering one end face 99 of the energy storage apparatus 1 is provided in a rack 901 will be described.

Figure 13:
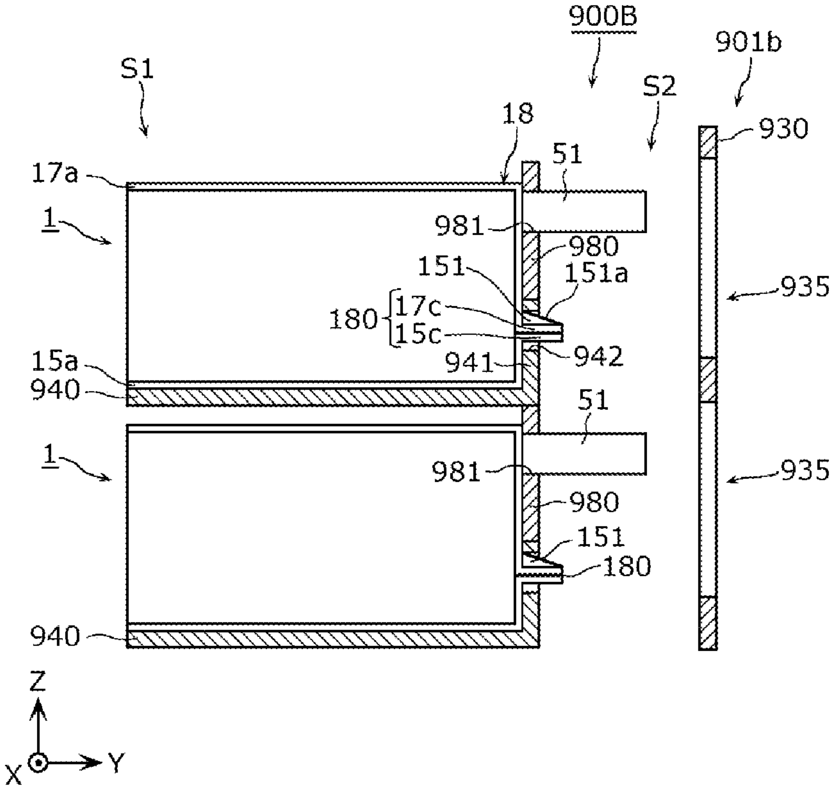
FIG. 13 is a cross-sectional view illustrating a schematic configuration of a wall according to a third embodiment.
Figure 14:
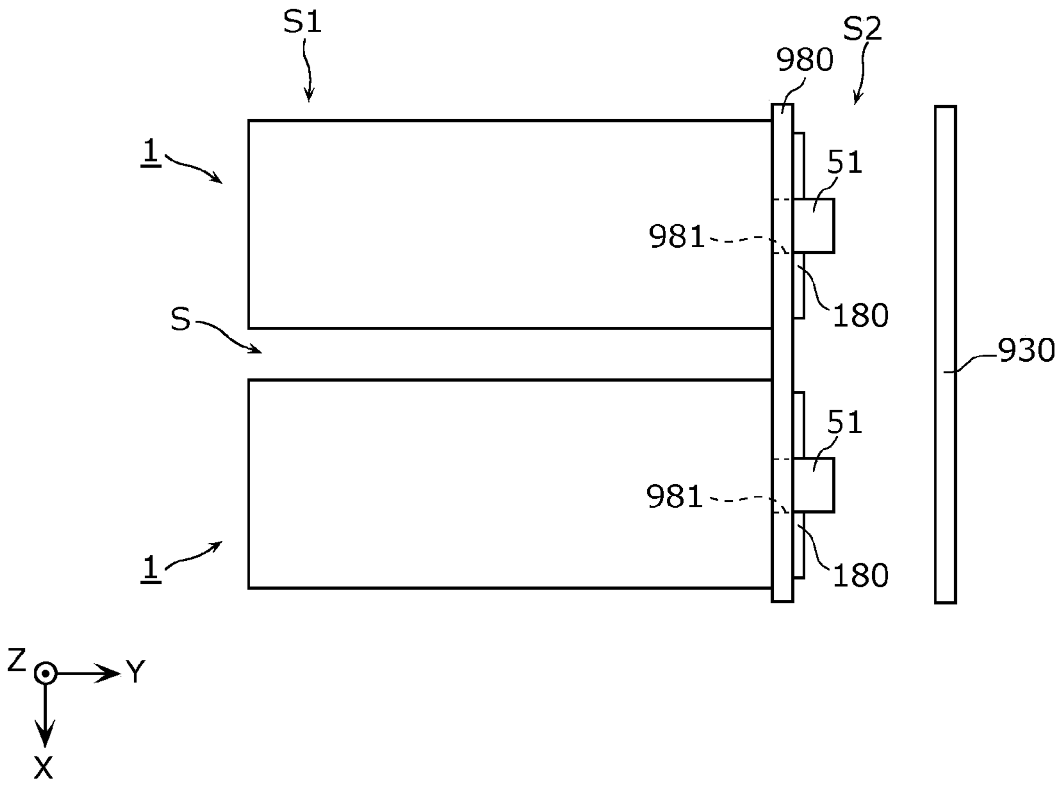
FIG. 14 is a top plan view illustrating a schematic configuration of the wall according to the third embodiment.

FIG. 13 is a cross-sectional view illustrating a schematic configuration of the wall 980 according to the third embodiment. Specifically, FIG. 13 is a view corresponding to FIG. 9. In FIG. 13, two energy storage apparatuses 1 arranged vertically are illustrated in a side view, and shelf plates 940 and a rear cover 930 are illustrated in a cross-sectional view. FIG. 14 is a top plan view illustrating a schematic configuration of the wall 980 according to the third embodiment.

As illustrated in FIG. 13, the walls 980 are fire-resistant plate members that are disposed on stoppers 941 of the shelf plates 940, and cover one end faces 99 of the energy storage apparatuses 1 from the Y-axis plus direction side. A through hole 981 through which an exhaust port portion 51 of each energy storage device 11 passes is formed in the wall 980. The wall 980 also covers a space between the shelf plates 940 disposed adjacently to each other in the vertical direction. As illustrated in FIG. 14, the wall 980 covers a space S between the respective energy storage apparatuses 1 disposed adjacently to each other in the X-axis direction from the Y-axis plus direction side. With such a configuration, in a rack 901*b*, the wall 980 defines a first space S1 where the plurality of energy storage apparatuses 1 are accommodated, and a second space S2 into which a gas G1 is discharged. As a result, the gas G1 discharged into the second space S2 can be blocked by the wall 980 and hence, the intrusion of the gas G1 into the first space S1 can be suppressed. Therefore, the plurality of energy storage apparatuses 1 accommodated in the rack 901*b* can be prevented from being exposed to the gas G1. Accordingly, the safety after the discharging of the gas can be enhanced.

The exhaust port portion 51 protrudes from the wall 980. Accordingly, the gas G1 discharged from the exhaust port portion 51 is discharged more outward than the wall 980. The wall 980 covers the space S from the exhaust port portion 51 side. Accordingly, it is possible to block a combustible gas discharged from the exhaust port portion 51 from being transferred from the space S to the energy storage apparatus 1 disposed adjacently to the space S by the wall 980. Therefore, the transfer of burning of one energy storage apparatus 1 to another energy storage apparatus 1 disposed adjacently to the energy storage apparatus 1 can be suppressed. Accordingly, safety after discharging a gas can be enhanced.

A through hole 981 through which the exhaust port portion 51 is exposed is formed in the wall 980 that covers the one end face 99 of the energy storage apparatus 1. Accordingly, the gas G1 discharged by the energy storage apparatus 1 itself is discharged from the through hole 981. When the energy storage apparatus 1 is exposed to the gas G1, the possibility that the energy storage apparatus 1 burns increases. However, one end face 99 of the energy storage apparatus 1 is covered with the wall 980, the wall 980 blocks the gas G1. That is, it is possible to prevent the energy storage apparatus 1 itself that has discharged the gas G1 from burning. Accordingly, it is possible to further enhance safety at the time of gas discharging.

The wall 980 is mounted on the rack 901*b*. Accordingly, it is unnecessary to provide a wall to the energy storage apparatus 1 and hence, it is possible to suppress the large-sizing of the energy storage apparatus 1. The rack 901*b* has less restriction on space and weight compared to the energy storage apparatus 1. Accordingly, the wall 980 having high heat resistance can be mounted. Accordingly, it is possible to further enhance safety after discharging a gas.

The wall 980 has fire resistance. Accordingly, the wall 980 is minimally thermally deformed and hence, opening of a hole in the wall 980 can be suppressed. Therefore, the burning of the energy storage apparatus 1 itself can be suppressed with more certainty and hence, safety after discharging a gas can be further enhanced.

In this embodiment, the case has been exemplified where the space S between the energy storage apparatuses 1 disposed adjacently to each other is covered with the wall 980. It is sufficient that the wall 980 covers a space between the energy storage apparatus and a portion disposed adjacently to the energy storage apparatus. As the portion disposed adjacently to the energy storage apparatus, besides the energy storage apparatus, an electric circuit unit, a lateral wall of the rack 901*b*, a member that is accommodated in the rack 901*b* other than the energy storage apparatus, and the like can be named.

Fourth Embodiment

In the above-described first embodiment, the case has been exemplified where the opening portion of the exhaust port portion 51 faces downward as viewed in the gas advancing direction. In the fourth embodiment, a case where an exhaust port portion 51 has fins is described.

Figure 15:
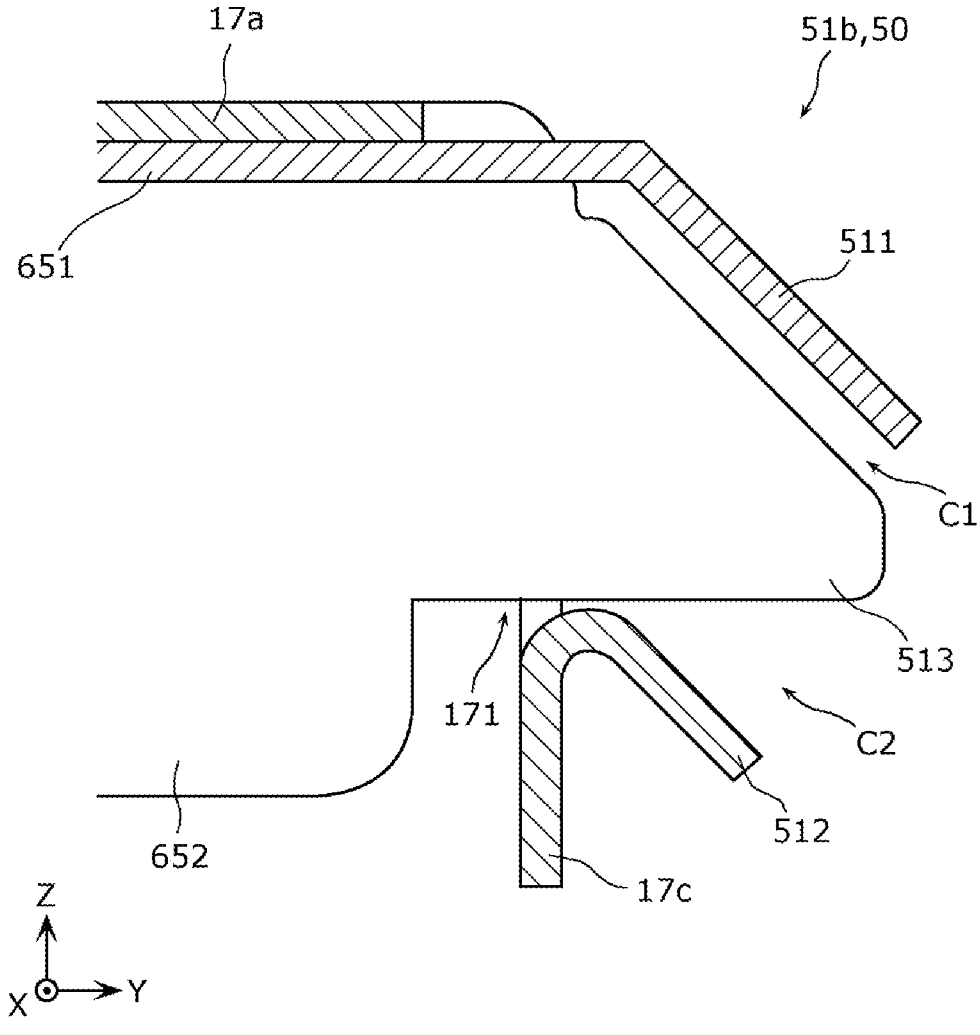
FIG. 15 is a cross-sectional view of an exhaust port portion according to a fourth embodiment.
Figure 16:
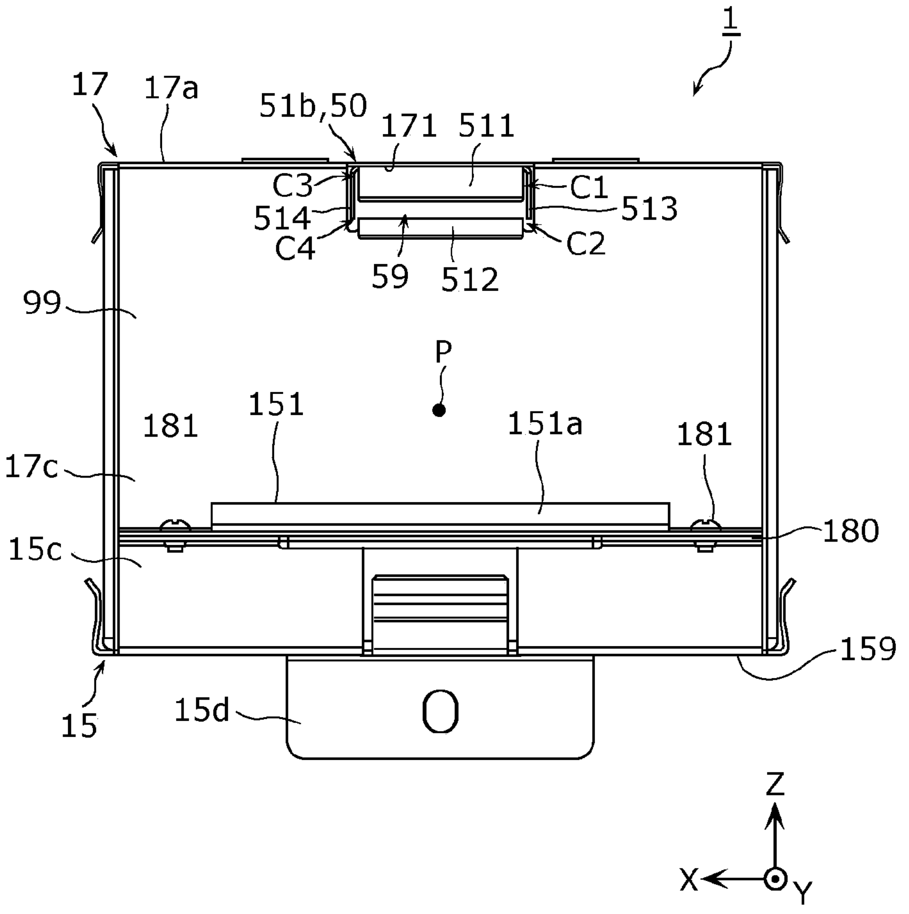
FIG. 16 is a plan view illustrating a schematic configuration of the exhaust port portion according to the fourth embodiment.

FIG. 15 is a cross-sectional view of an exhaust port portion 51*b* according to the fourth embodiment. FIG. 16 is a plan view illustrating a schematic configuration of the exhaust port portion 51*b* according to the fourth embodiment. As illustrated in FIG. 15 and FIG. 16, the exhaust port portion 51*b* protrudes from an end of an outer case body 14 in the Y-axis plus direction, and forms an outlet portion of an exhaust path 59. Specifically, the exhaust port portion 51*b* is a fin portion, and includes a first fin 511, a second fin 512, a third fin 513, and a fourth fin 514. The first fin 511, the third fin 513, and the fourth fin 514 are mounted on a lid member 65, and the second fin 512 is mounted on an outer case lid 17. The first fin 511 and other fins (the second fin 512, the third fin 513, and the fourth fin 514) are disposed so as to surround the outlet portion of the exhaust path 59. That is, the first fin 511, the second fin 512, the third fin 513, and the fourth fin 514 are arranged along the circumferential direction of the exhaust path 59. The first fin 511, the second fin 512, the third fin 513, and the fourth fin 514 maintain the same posture before and after a gas release valve 111 is opened.

Hereinafter, the details of the respective fins are described.

The first fin 511 is one end of a top plate portion 651 of a lid member 65 in the Y-axis plus direction. The first fin 511 is a portion of the top plate portion 651 that projects outward from an opening portion 171 formed in an outer case lid 17. The first fin 511 protrudes from an outer case body 14 in an inclined state. Specifically, the first fin 511 is formed in a rectangular flat plate shape elongated in the X-axis direction. The first fin 511 is inclined with respect to an advancing direction (Y-axis direction) of a gas. The first fin 511 is disposed above an exhaust path 59, and is inclined downward. An acute angle made by the first fin 511 and the Y-axis direction falls within a range of thirty degrees to sixty degrees inclusive. In the present embodiment, the acute angle made by the first fin 511 and the Y-axis direction is approximately forty five degrees. The first fin 511 is formed in a size that allows the first fin 511 to fall within the exhaust path 59 as viewed in the Y-axis direction. The first fin 511 has a size that allows the first fin 511 to overlap with a half or more of the exhaust path 59 as viewed in the Y-axis direction. Therefore, the first fin 511 serves as a barrier against most of a gas discharged from the exhaust path 59.

The second fin 512 protrudes outward from a lower edge portion of an opening portion 171 formed in the outer case lid 17. Specifically, the second fin 512 is formed in a rectangular flat plate shape elongated in the X-axis direction. The second fin 512 protrudes toward a Y-axis plus direction side from an edge portion below the opening portion 171. The second fin 512 faces the first fin 511 in the Z-axis direction. In the present embodiment, the case has been exemplified where a protruding length of the second fin 512 in the Y-axis direction is shorter than a protruding length of the first fin 511. However, the protruding length of the second fin 512 may be equal to or longer than the protruding length of the first fin 511. The second fin 512 is a portion that is formed by cutting and raising when the opening portion 171 is formed in the connecting portion 17*c* of the outer case lid 17. The second fin 512 protrudes from the connecting portion 17*c* in an inclined state. The second fin 512 is disposed below an exhaust path 59, and is inclined downward. An acute angle made by the second fin 512 and the Y-axis direction falls within a range of thirty degrees to sixty degrees inclusive. In the present embodiment, the acute angle made by the second fin 512 and the Y-axis direction is approximately forty five degrees. That is, the second fin 512 is disposed parallelly to the first fin 511. The second fin 512 may be non-parallel to the first fin 511.

The third fin 513 is mounted on a wall portion 652 of a pair of wall portions 652 of the lid member 65 in the X-axis minus direction. The fourth fin 514 is mounted on the wall portion 652 of the pair of wall portions 652 of the lid member 65 in the X-axis plus direction. The third fin 513 and the fourth fin 514 are disposed so as to face each other in the X-axis direction. The third fin 513 and the fourth fin 514 have substantially the same structure except for that their mounting positions are different. Therefore, in the present embodiment, the details of the third fin 513 will be described, and the description of the fourth fin 514 is omitted.

The third fin 513 is one end in the Y-axis plus direction of the wall portion 652 in the X-axis minus direction. The third fin 513 is a flat-plate-shaped portion of the wall portion 652 that protrudes outward from the opening portion 171 formed in the outer case lid 17. The third fin 513 protrudes in parallel with the Y-axis direction. The third fin 513 is disposed between the first fin 511 and the second fin 512 in the circumferential direction of the exhaust path 59. A protruding length of the third fin 513 in the Y-axis direction is substantially equal to a protruding length of the first fin 511. The third fin 513 has a tapered shape that becomes thinner toward the Y-axis plus side. Specifically, the third fin 513 is formed in a shape that prevents the third fin 513 from overlapping with the first fin 511 and the second fin 512 as viewed in the X-axis direction.

As described above, the third fin 513 has a shape that prevents the third fin 513 from overlapping with the first fin 511 and the second fin 512. Accordingly, a gap C1 is formed between the first fin 511 and the third fin 513, and a gap C2 is formed between the second fin 512 and the third fin 513. In the present embodiment, the case where the third fin 513 is formed in a trapezoidal shape as viewed in the X-axis direction has been exemplified, but any shape may be used as long as the gaps C1 and C2 are formed. As described above, the fourth fin 514 has substantially the same structure as the third fin 513. Accordingly, a gap C3 is formed between the first fin 511 and the fourth fin 514, and a gap C4 is formed between the second fin 512 and the fourth fin 514. The respective gaps C1 to C4 are continuously formed over the entire length of the exhaust port portion 51*b*. Specifically, as illustrated in FIG. 16, the gaps C1 and C3 are gaps extending with a uniform width as a whole. The gaps C2 and C4 are gaps whose widths are gradually increased toward the Y-axis plus direction side.

Figure 17:
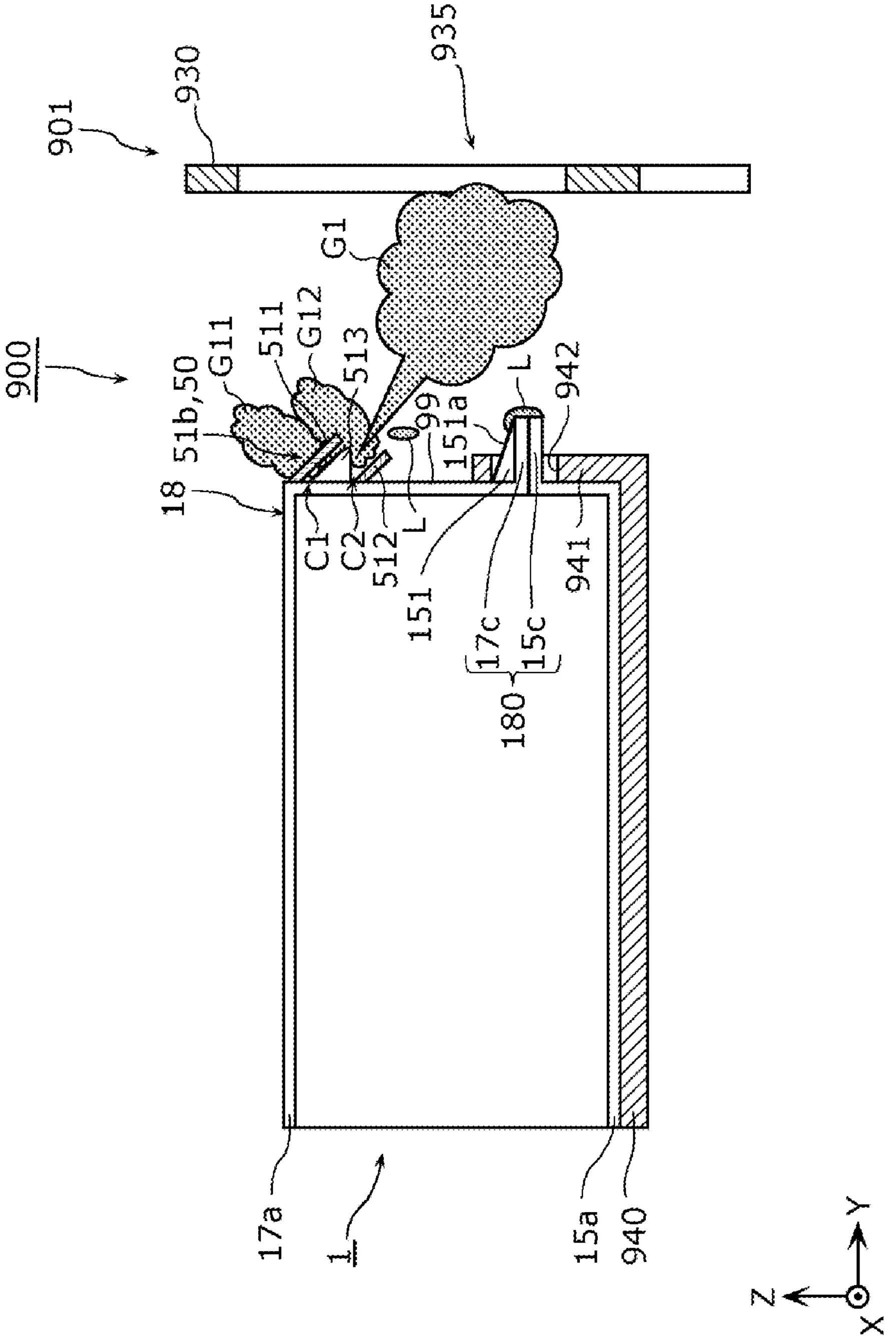
FIG. 17 is a side view illustrating a schematic configuration of the exhaust port portion according to the fourth embodiment.

FIG. 17 is a side view illustrating a schematic configuration of the exhaust port portion 51*b* according to the fourth embodiment. In FIG. 17, the exhaust port portion 51*b*, a shelf plate 940, and a rear cover 930 are illustrated in a cross-sectional view.

The exhaust port portion 51*b* protrudes outward from the end of the bus bar frame 12 and the end of the outer case 18 in the Y-axis plus direction. The exhaust port portion 51*b* protrudes outward from the end of the shelf plate 940 in the Y-axis plus direction.

A gas discharged from the gas release valves 111 of the respective energy storage devices 11 enters the exhaust path 59 defined by the exhaust member 60 and the lid member 65 through the holes 61 formed in the exhaust member 60. Thereafter, the gas passes through the exhaust path 59, and is discharged to the outside of an energy storage unit 10 from the exhaust port portion 51*b* disposed outside the outer case 18. As described above, in the exhaust port portion 51*b*, the first fin 511, the second fin 512, the third fin 513, and the fourth fin 514 surround the outlet portion of the exhaust path 59. Therefore, the first fin 511, the second fin 512, the third fin 513, and the fourth fin 514 control the course of a gas that has passed through the exhaust path 59. In particular, the first fin 511 serves as a barrier when the gas advances straight and hence, the advancing direction of the gas is changed to the downward direction.

In FIG. 17, the gas whose advancing direction is changed by the exhaust port portion 51*b* is illustrated with a symbol G1. The advancing direction of the gas G1 is changed when the gas G1 impinges on the first fin 511. Accordingly, the flow energy that the gas G1 possesses is reduced when the gas G1 is brought into contact with the first fin 511. With respect to the gas G1, an advancing distance of the gas G1 to the slit group 935 is longer than the corresponding advancing distance of the gas G1 when the advancing direction remains straight. Also with such a configuration, the flow energy of the gas G1 is reduced. When the acute angle made by the first fin 511 and the Y-axis direction is less than thirty degrees, the distance to the slit group 935 that the gas G1 advances cannot be made elongated largely. On the other hand, when the acute angle formed by the first fin 511 and the Y-axis direction is larger than sixty degrees, the first fin 511 blocks the exhaust path 59, that may hinder smooth exhaust. In view of the above, as described above, the acute angle made by the first fin 511 and the Y-axis direction falls within a range of thirty degrees to sixty degrees inclusive.

A gas also leaks from the respective gaps C1 to C4. In FIG. 17, the gas that leaks from the gap C1 is denoted by a symbol G11, and the gas that leaks from the gap C2 is denoted by a symbol G12. As described above, the gases G11 and G12 are diffused by being discharged from the gaps C1 to C4, and hence, the flow energy of the gas G1 is further reduced.

Figure 18:
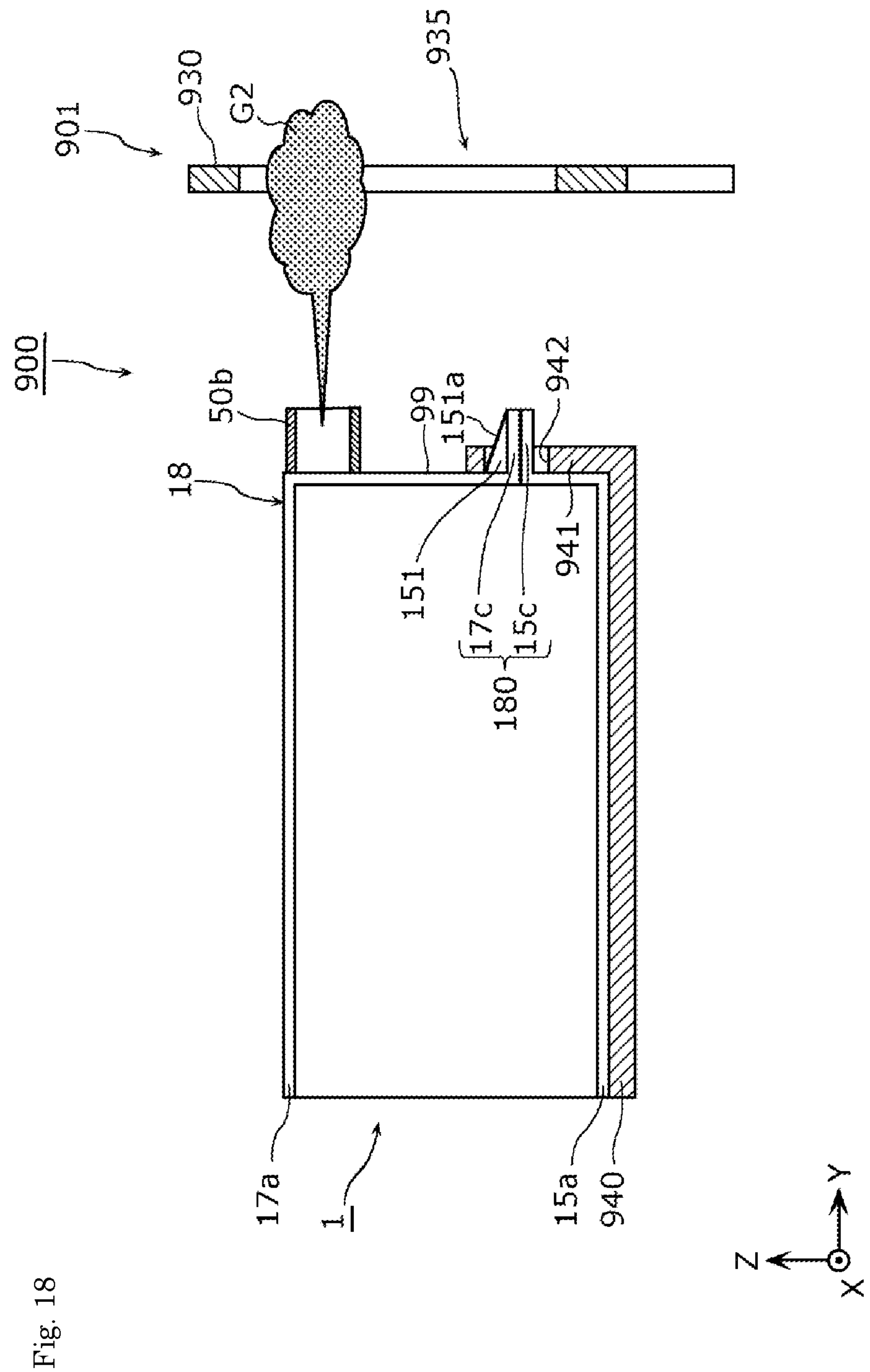
FIG. 18 is a side view illustrating a gas discharged from an exhaust portion of a comparative example.

FIG. 18 is a side view illustrating a gas G2 discharged from an exhaust portion 50*b* of a comparative example. FIG. 18 is a view corresponding to FIG. 17. An exhaust portion 50*b* of the comparative example is different from the exhaust portion 50 according to the present embodiment with respect to a point that one end of the exhaust portion 50*b* in the Y-axis plus direction has a cylindrical shape. With such a configuration, a gas G2 is energetically jetted from one end of the exhaust portion 50*b*. Due to this flow energy of the gas G2, the gas G2 impinges on other devices (facilities such as other power storage facilities) in the vicinity of the energy storage facility 900 through the slit group 935 formed in the rear cover 930. As a result, there is a possibility that the gas G2 adversely affects other apparatuses.

On the other hand, as illustrated in FIG. 17, in the exhaust port portion 51*b* according to the present embodiment, the gas G1 whose flow energy has been reduced is discharged from the slit group 935. As a result, the gas G1 minimally reaches other apparatuses and hence, adverse effects brought about by the gas G1 on other apparatuses can be suppressed.

As has been described above, the energy storage apparatus according to the present embodiment includes: the plurality of energy storage devices 11 each having the gas release valve 111, the plurality of energy storage devices 11 being arranged in a posture where the gas release valves 111 are directed in the same direction; the exhaust portion 50 disposed on the gas release valves 111 of the plurality of respective energy storage devices 11, the exhaust portion 50 forming the exhaust path 59 for a gas discharged from the gas release valves 111; the outer case body 14 (housing) accommodating the plurality of the energy storage devices 11 and the exhaust portion 50; and the exhaust port portion 51*b* that protrudes from the outer case body 14 and forms an outlet portion of the exhaust path 59. The exhaust port portion 51*b* has the first fin 511 that protrudes from the outer case body 14 in an inclined state.

With such a configuration, the first fin 511 protrudes from the outer case body 14 in an inclined state and hence, the course of a gas G1 can be controlled by the first fin 511. Therefore, it is possible to prevent the gas G1 from impinging on another apparatus disposed adjacently to the energy storage apparatus 1. The first fin 511 serves as a barrier when a gas advances straight. Accordingly, it is also possible to reduce flow energy of the gas G1 that advances toward another apparatus. Therefore, it is possible to suppress an adverse effect of the gas G1 on another apparatus, and it is possible to suppress burning of another apparatus. With such a configuration, the energy storage apparatus of the present invention can enhance safety at the time of gas discharging.

The exhaust port portion 51*b* has the plurality of other fins (the second fin 512, the third fin 513, and the fourth fin 514) that surround the outlet portion of the exhaust path 59 together with the first fin 511.

With such a configuration, the outlet portion of the exhaust path 59 is surrounded by the first fin 511 and the plurality of other fins. Accordingly, the course of the gas G1 can be controlled with more certainty. As a result, it is possible to prevent the gas G1 from impinging on another apparatus with more certainty and hence, it is possible to further enhance safety at the time of gas discharging.

The gaps C1 to C4 are formed in at least one of spaces formed between the first fin 511 and the plurality of other fins.

With such a configuration, the gaps C1 to C4 are formed in at least one of the spaces formed between the first fin 511 and the plurality of other fins. Accordingly, the gases G11, G12 are discharged also through the gaps C1 to C4. As a result, the gases G11, G12 are diffused and hence, it is possible to prevent the gases G11, G12 from impinging on another apparatus with more certainty. The flow energy of the gas G1 is also reduced and hence, it is possible to suppress the gas G1 from impinging on another apparatus with more certainty. That is, it is possible to further enhance safety at the time of gas discharging.

The energy storage apparatus 1 includes the outer case lid 17 (cover member) that covers the outer case body 14 and has the opening portion 171 through which the exhaust port portion 51*b* is made to protrude. The plurality of other fins includes the second fin 512 that faces the first fin 511, and the third fin 513 and the fourth fin 514 that are disposed between the first fin 511 and the second fin 512 in a circumferential direction. The first fin 511, the third fin 513, and the fourth fin 514 are mounted on the exhaust portion 50, and the second fin 512 is mounted on the outer case lid 17.

In such a configuration, the first fin 511, the third fin 513, and the fourth fin 514 are mounted on the exhaust portion 50, and the second fin 512 is mounted on the outer case lid 17. Accordingly, the structure where the outlet portion is surrounded by the respective fins can be easily formed.

The outer case body 14 is covered with the outer case lid 17 and hence, it is possible to suppress applying of an electrolyte solution L discharged together with a gas from the exhaust port portion 51*b* to the outer case body 14. Accordingly, it is possible to suppress the ignition caused by the electrolyte solution L. Accordingly, it is possible to further enhance safety at the time of gas discharging.

The first fin 511 is disposed above the exhaust path 59, and is inclined such that the distal end of the first fin 511 faces downward.

With such a configuration, the first fin 511 is disposed above the exhaust path 59 and the distal end of the first fin 511 is inclined such that the distal end of the first fin 511 faces downward. Accordingly, it is possible to make a gas impinge on the first fin 511 with certainty and hence, the course of the gas can be controlled with certainty. Accordingly, it is possible to further enhance safety at the time of gas discharging.

The first fin 511 is inclined such that the distal end of the first fin 511 faces downward. Accordingly, a gas can be easily discharged to an area in the vicinity of the energy storage apparatus 1, and can easily stay in the rack 901. Therefore, such a configuration is suitable when the diffusion of a gas to the outside of the rack 901 is not desirable.

The first fin 511 falls within the exhaust path 59 when the exhaust path 59 is viewed in a gas advancing direction. Accordingly, it is possible to suppress large-sizing of the energy storage apparatus 1 in an upward direction.

(Miscellaneous)

The energy storage apparatus according to the embodiment has been described heretofore. However, the present invention is not limited to the above described embodiments. That is, the embodiments disclosed herein are illustrative in all respects and are not limitative. The scope of the present invention is defined by the claims, and includes meanings equivalent to the claims and all modifications within the scope.

Figure 19:
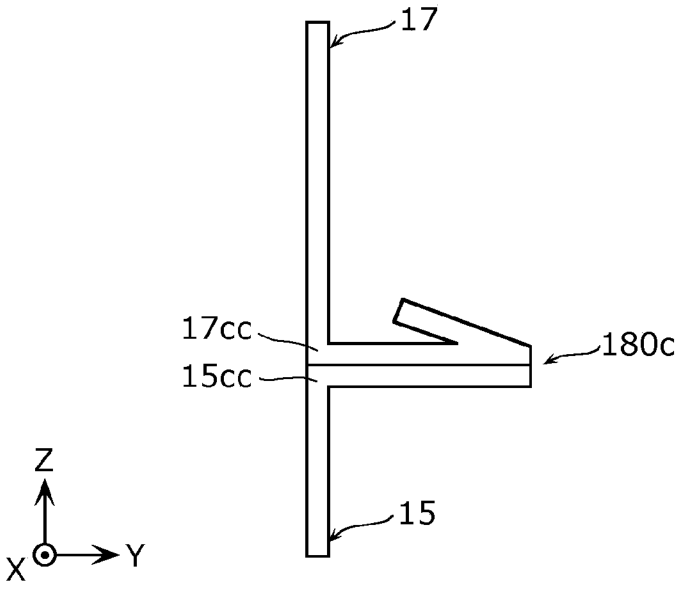
FIG. 19 is a side view illustrating a schematic configuration of a protruding portion according to a first modification.

In the above-described first embodiment, the case has been exemplified where the protruding portion 180 has a tapered shape by having the elastic body 151. The protruding portion may not have the elastic body. In this case, it is sufficient that at least either one of the connecting portion 15*c* of the outer case support 15 or the connecting portion 17*c* of the outer case lid 17 has a shape tapered in the thickness direction. FIG. 19 is a side view illustrating a schematic configuration of a protruding portion 180*c* according to a first modification. As illustrated in FIG. 19, out of a connecting portion 15*cc* of an outer case support 15 and a connecting portion 17*cc* of an outer case lid 17 where the outer case support 15 and the outer case lid 17 form a protruding portion 180*c*, by folding back a distal end of the connecting portion 17*cc* upward, a distal end of the protruding portion 180*c* has a tapered shape in the thickness direction. The protruding portion may have a uniform shape in the thickness direction. The protruding portion may have a shape tapered in the width direction (X-axis direction).

In the above-described first embodiment, the case is exemplified where the protruding portion 180 is formed of the connecting portion 15*c* of the outer case support 15; and the connecting portion 17*c* of the outer case lid 17. The protruding portion 180 may be formed of only a part of the outer case support or only a part of the outer case lid. The protruding portion 180 may be formed of a member attached to the outer case 18 (housing) by being attached later.

In the above-described first embodiment, the case is exemplified where the exhaust port portion 51 protrudes more than the protruding portion 180 (eaves portion) in the Y-axis plus direction. However, the exhaust port portion may not project from the protruding portion.

In the above-described first embodiment, the case has been exemplified where the protruding portion 180 is disposed below the center P of one end face 99. However, the protruding portion may be disposed above the center P as long as the protruding portion 180 is disposed below the exhaust port portion 51.

In the above-described fourth embodiment, the case has been exemplified where the exhaust port portion 51*b* has the first fin 511 to the fourth fin 514. It is sufficient that the exhaust port portion includes at least the first fin. Therefore, it is sufficient that the total number of fins formed on the exhaust port portion may be at least one.

In the above-described fourth embodiment, the case has been exemplified where the gaps C1 to C4 are formed in spaces between the first fin 511 to the fourth fin 514. However, it is sufficient that the gap is formed in at least one space. The gap may not be formed between the respective fins.

In the above-described fourth embodiment, the case has been exemplified where the first fin 511, the third fin 513, and the fourth fin 514 are integrally formed on the lid member 65 of the exhaust portion 50 by molding, and the second fin 512 is integrally formed on the outer case lid 17 by molding. The respective fins may be disposed at any places. Further, the respective fins may be prepared as bodies separate from the lid member or the outer case lid, and the respective fins may be attached to the lid member or the outer case lid later.

In the above-described fourth embodiment, the case has been exemplified where the first fin 511 is disposed above the exhaust path 59, and is inclined such that the distal end of the first fin 511 faces downward. As long as the first fin is disposed in an inclined state in the exhaust path, the first fin may be disposed at any position and in any inclination direction. The first fin may be disposed below the exhaust path, and may be inclined such that the distal end of the first fin faces upward. The first fin may be disposed on one side of the exhaust path in the X-axis direction, and may be inclined such that the distal end of the first fin is directed toward the other side of the exhaust path.

Figure 20:
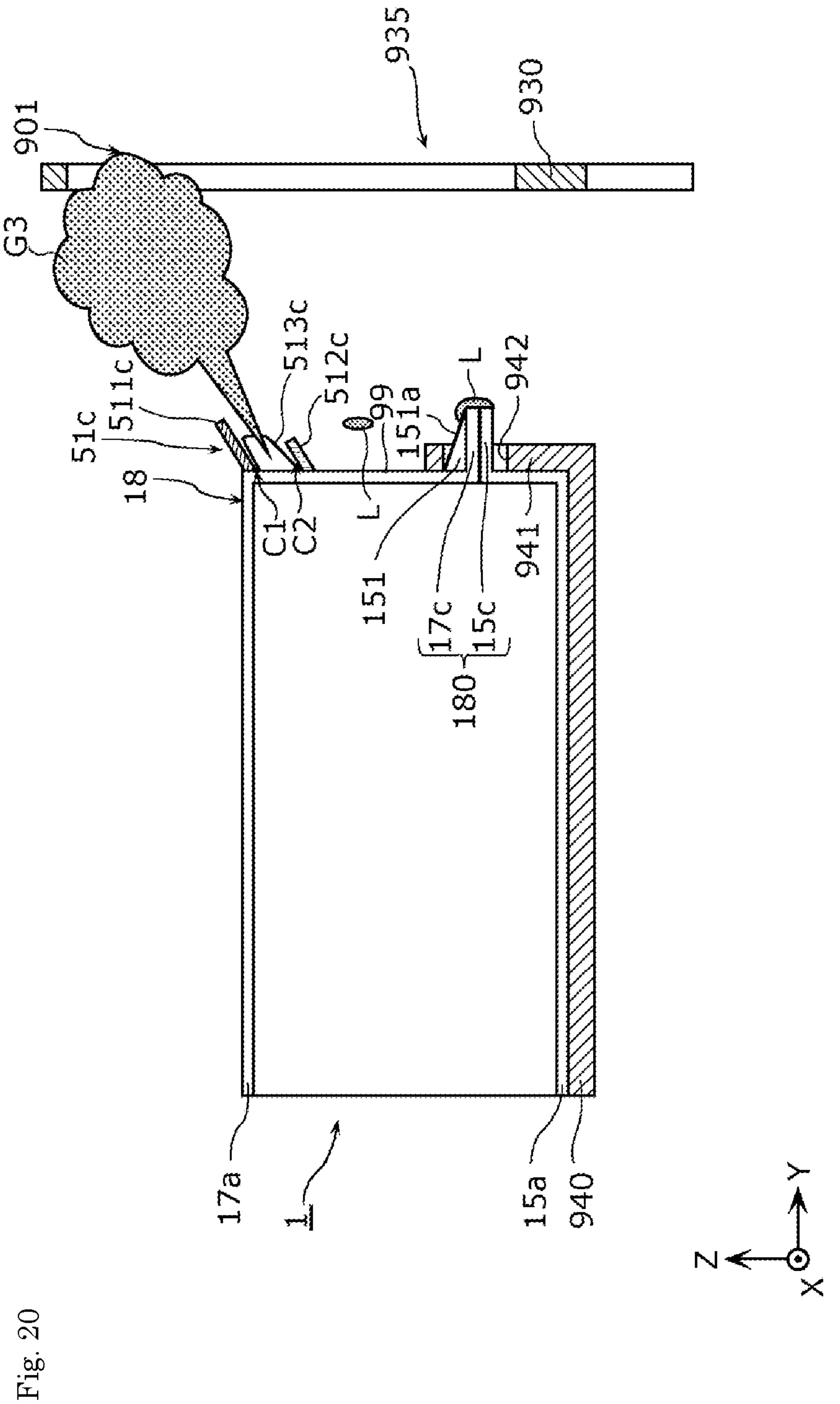
FIG. 20 is a side view illustrating a schematic configuration of an exhaust port portion according to a second modification.

FIG. 20 is a side view illustrating a schematic configuration of an exhaust port portion 51*c* according to a second modification. Specifically, FIG. 20 is a view corresponding to FIG. 17. As illustrated in FIG. 20, an exhaust port portion 51*c* according to the second modification includes a first fin 511*c*, a second fin 512*c*, a third fin 513*c*, and a fourth fin (not illustrated). The first fin 511*c* is disposed above an exhaust path 59, and is inclined such that a distal end of the first fin 511*c* faces upward. The second fin 512*c* is disposed below the exhaust path 59, and is inclined such that a distal end of the second fin 512*c* faces upward. The third fin 513*c* and the fourth fin are formed in a shape that forms a gap C1 with respect to the first fin 511*c* and forms the gap C2 with respect to the second fin 512*c*. In FIG. 20, the illustration of gases leaking from the gaps C1 and C2 is omitted.

In the exhaust port portion 51*c*, the first fin 511*c*, the second fin 512*c*, the third fin 513*c*, and the fourth fin surround an outlet portion of the exhaust path 59. Therefore, the first fin 511*c*, the second fin 512*c*, the third fin 513*c*, and the fourth fin control the course of a gas that has passed through the exhaust path 59. A gas G3 is at a high temperature and hence, the gas G3 is likely to rise. The first fin 511*c* is inclined such that a distal end of the first fin 511*c* faces upward. Accordingly, the rising of the gas G3 is minimally blocked. Therefore, the gas G3 can be discharged to a place remote from an energy storage apparatus 1. In particular, in the present modification, the second fin 512*c* is also inclined such that a distal end of the second fin 512*c* faces upward. Accordingly, the gas G3 is guided upward by impinging on the second fin 512*c* and hence, the gas G3 is discharged to a remoter place. As described above, the exhaust port portion 51*c* according to the present modification is suitable when it is desired to discharge the gas G3 to the outside while preventing the gas G3 from staying in a rack 901. In this case, it is desirable to arrange a slit group 935 on a discharge course of the gas G3.

In the above-described fourth embodiment, the case has been exemplified where the first fin 511 and the second fin

512 are formed in a flat plate shape. The first fin and the second fin may be formed in a curved plate shape.

The present invention can be realized not only as the energy storage apparatus 1 but also as the energy storage facility 900.

The configurations that are formed by arbitrarily combining the respective constituent elements that the above-described embodiments and the above-described modifications include also fall within the scope of the present invention.

INDUSTRIAL APPLICABILITY

The present invention is applicable to an energy storage apparatus that includes an energy storage device such as a lithium ion secondary battery or the like.

DESCRIPTION OF REFERENCE SIGNS

1: energy storage apparatus
10: energy storage unit
11: energy storage device
11*a*: case
11*b*: positive electrode terminal
11*c*: negative electrode terminal
11*d*: spacer
12: bus bar frame
13: bus bar
13*a*: detection line
13*b*: connector
14: outer case body
15: outer case support (second reinforcing member)
15*a*: bottom portion
15*b*: connecting portion
15*c*, 15*cc*: connecting portion (one end)
15*d*: fixing portion (end on the other side)
16: substrate unit mounting portion
17: outer case lid (first reinforcing member)
17*a*: top surface portion
17*b*: connecting portion
17*c*, 17*cc*: connecting portion (one end)
18: outer case (housing)
20: substrate unit
30: cable
31: positive electrode power supply cable
32: negative electrode power supply cable
50: exhaust portion
51, 51*a*, 51*b*, 51*c*: exhaust port portion
51*e*: exhaust port portion
59: exhaust path
60, 60*a*: exhaust member
61: hole
62: contact portion
63: groove
64: annular portion
65, 65*a*: lid member
71: first holding portion
72: second holding portion
73: connecting portion
99: one end face
111: gas release valve
141: cutout portion
151: elastic body
151*a*: inclined surface
159: mounting surface
171: opening portion
180, 180*c*: protruding portion (eaves portion)
181: screw
511, 511*c*: first fin
512, 512*c*: second fin
513, 513*c*: third fin
514: fourth fin
601: wall portion
602: groove
621: elastic body
651: top plate portion
652: wall portion
711: first outer wall
711*a*, 711*b*: first cutout
712: first surrounding wall
713: first partition wall
714: first partition portion
715: first cable path portion
721: second outer wall
721*a*: second cutout
722: second surrounding wall
723: second partition wall
724: second partition portion
725: second cable path portion
731: beam portion
900, 900B: energy storage facility
901, 901*b*: rack
910: rack body
920: front cover
925, 935: slit group
930: rear cover
940: shelf plate (support member)
941: stopper
942: support hole
943: serrated structure
944: concave part
945: convex part
980: wall
981: through hole
C1 to C4: gap
G1, G11, G12, G3: gas
G2: gas
L: electrolyte solution
P: center
S: space
S1: first space
S2: second space

The invention claimed is:

1. An energy storage apparatus comprising:

a plurality of energy storage devices each including a gas release valve, the plurality of energy storage devices being arranged along a predetermined direction in a posture where the gas release valves are directed in the same direction;

an exhaust portion disposed on the gas release valves of the plurality of respective energy storage devices, the exhaust portion forming an exhaust path for a gas discharged from the gas release valves; and a housing accommodating the plurality of the energy storage devices and the exhaust portion, wherein the exhaust portion includes an exhaust port portion that protrudes from the housing and forms an outlet portion of the exhaust path, wherein the exhaust port portion has a shape in which one end is opened as viewed in an advancing direction of the gas, wherein the exhaust port portion is configured to protrude outward from an end of a support member, the support member being external to the housing, wherein the plurality of energy storage devices are mounted on the support member, wherein the support member includes a plate body portion and a stopper that protrudes upward from the plate body portion, and the exhaust port portion protrudes outward from the stopper in the predetermined direction, wherein the exhaust portion is disposed on a first surface of the energy storage devices, the first surface being opposite a second surface of the energy storage devices, and wherein the second surface of the energy storage devices is configured to be in contact with the support member external to the housing.

2. The energy storage apparatus according to claim 1, wherein an opening portion of the exhaust port portion faces upward.

3. The energy storage apparatus according to claim 2, wherein an opening portion of the exhaust port portion faces downward.

4. The energy storage apparatus according to claim 1, wherein the housing includes a first reinforcing member that covers an upper side of the plurality of energy storage devices, wherein the exhaust port portion, and a protruding portion that protrudes from and is formed on one end face of the energy storage apparatus in a predetermined direction, and wherein the protruding portion is formed of one end of the first reinforcing member, and is disposed between the exhaust port portion and a mounting surface of the energy storage apparatus.

5. The energy storage apparatus according to claim 4, wherein the exhaust port portion protrudes more outward than the protruding portion along the predetermined direction from the one end face.

6. The energy storage apparatus according to claim 4, wherein when viewed from the predetermined direction, the exhaust port portion is disposed above the center of the one end face of the energy storage apparatus, and the protruding portion is disposed below the center of the one end face of the energy storage apparatus.

7. The energy storage apparatus according to claim 4, further comprising a second reinforcing member that is disposed below the plurality of energy storage devices and reinforces the plurality of energy storage devices by sandwiching the plurality of energy storage devices together with the first reinforcing member, wherein the protruding portion connects one ends of the first reinforcing member and the second reinforcing member to each other, and wherein the exhaust portion is pressed by the first reinforcing member.

8. The energy storage apparatus according to claim 7, wherein the exhaust portion presses the plurality of energy storage devices by a pressing force received from the first reinforcing member.

9. The energy storage apparatus according to claim 4, wherein the protruding portion is inserted into a support hole provided in the stopper of the support member for supporting the mounting surface of the energy storage apparatus from below.

10. The energy storage apparatus according to claim 1, wherein the exhaust port portion includes a first fin protruding from the housing in an inclined state.

11. The energy storage apparatus according to claim 10, wherein the exhaust port portion includes a plurality of other fins surrounding the outlet portion together with the first fin.

12. The energy storage apparatus according to claim 11, wherein a gap is formed in at least one of spaces formed between the first fin and the plurality of other fins, further comprising a cover member that includes an opening portion through which the exhaust port portion is made to protrude, wherein the plurality of other fins include a second fin that faces the first fin, and a third fin and a fourth fin that are disposed between the first fin and the second fin in a circumferential direction, wherein the first fin, the third fin, and the fourth fin are mounted on the exhaust portion, and wherein the second fin is mounted on the cover member.

13. The energy storage apparatus according to claim 10, wherein the first fin is disposed above the exhaust path, and is inclined such that a distal end of the first fin faces downward.

14. The energy storage apparatus according to claim 10, wherein the first fin is disposed above the exhaust path and is inclined such that a distal end of the first fin faces upward.

15. An energy storage apparatus comprising:

a plurality of energy storage devices each including a gas release valve, the plurality of energy storage devices being arranged along a predetermined direction in a posture where the gas release valves are directed in the same direction;

an exhaust portion disposed on the gas release valves of the plurality of respective energy storage devices, the exhaust portion forming an exhaust path for a gas discharged from the gas release valves; and a protruding portion formed on an end of the energy storage apparatus in the predetermined direction, wherein the plurality of the energy storage devices are configured to be mounted on a support member that is external to the energy storage apparatus, wherein the support member includes:

a first portion formed along the plurality of energy storage devices in a direction orthogonal to the exhaust path, the first portion having a hole formed therein; and a second portion formed along the plurality of energy storage devices in the predetermined direction, wherein the protruding portion of the energy storage apparatus is inserted into and therethrough the hole of the first portion of the support member, wherein the exhaust portion is disposed on a first surface of the energy storage devices, the first surface being opposite a second surface of the energy storage devices, wherein the support member further includes a plate body portion disposed along the second surface of the energy storage devices, wherein the first portion protrudes upward from the plate body portion, wherein the second surface of the energy storage devices is configured to be in contact with the support member external to the energy storage apparatus, wherein the first portion of the support member includes a serrated structure formed on an upper side of the hole, wherein the serrated structure of the first portion of the support member engages with the protruding portion of the energy storage apparatus, and wherein the protruding portion includes an elastic body that meshes with the serrated structure of the support member.

16. An energy storage apparatus comprising:

a plurality of energy storage devices each including a gas release valve, the plurality of energy storage devices being arranged along a predetermined direction in a posture where the gas release valves are directed in the same direction;

an exhaust portion disposed on the gas release valves of the plurality of respective energy storage devices, the exhaust portion forming an exhaust path for a gas discharged from the gas release valves; and a protruding portion formed on an end of the energy storage apparatus in the predetermined direction, wherein the plurality of the energy storage devices are configured to be mounted on a support member that is external to the energy storage apparatus, wherein, when viewed in a direction orthogonal to the predetermined direction, a portion of the support member is disposed between the protruding portion and the exhaust portion, wherein the exhaust portion is disposed on a first surface of the energy storage devices, the first surface being opposite a second surface of the energy storage devices, wherein the second surface of the energy storage devices is configured to be in contact with the support member that is external to the energy storage apparatus, wherein the support member includes:

a plate body portion in contact with the second surface of the energy storage devices; and a stopper portion that protrudes upward from an end of the plate body portion, wherein the portion of the support member disposed between the protruding portion and the exhaust portion is the stopper portion, and wherein the protruding portion includes an elastic body that meshes with the support member.

17. The energy storage apparatus according to claim 1, wherein the support member extends outwardly from the plurality of energy storage devices mounted thereon in at least two directions.

18. The energy storage apparatus according to claim 1, wherein the exhaust port portion has a wall on a third surface of the plurality of energy storage devices.

19. The energy storage apparatus according to claim 1, wherein the exhaust port portion protrudes through a wall of the plurality of energy storage devices.

* * * * *